US012243672B2

(12) United States Patent
Oberrauch et al.

(10) Patent No.: US 12,243,672 B2
(45) Date of Patent: Mar. 4, 2025

(54) COIL FORMER FOR IMPROVED WINDING WINDOW UTILIZATION

(71) Applicant: ALPITRONIC SRL, Bolzano (IT)

(72) Inventors: Andreas Oberrauch, Eppan (IT); Bernhard Kofler, Eppan (IT); Tizian Senoner, Eppan (IT)

(73) Assignee: ALPITRONIC SRL, Bolzano (IT)

( * ) Notice: Subject to any disclaimer, the term of this patent is extended or adjusted under 35 U.S.C. 154(b) by 0 days.

(21) Appl. No.: 18/426,808

(22) Filed: Jan. 30, 2024

(65) Prior Publication Data

US 2024/0258010 A1 Aug. 1, 2024

Related U.S. Application Data

(60) Provisional application No. 63/441,908, filed on Jan. 30, 2023.

(51) Int. Cl.
*H01F 27/30* (2006.01)
*H01F 27/06* (2006.01)
*H01F 27/28* (2006.01)

(52) U.S. Cl.
CPC ......... *H01F 27/06* (2013.01); *H01F 27/2823* (2013.01)

(58) Field of Classification Search
CPC ..................................................... H01F 27/325
USPC ................................................. 336/199, 221
See application file for complete search history.

(56) References Cited

U.S. PATENT DOCUMENTS

2014/0132382 A1 * 5/2014 Zarei ........................ H01F 37/00 336/61
2022/0122763 A1 * 4/2022 Jiao ............................ H01F 5/02

* cited by examiner

*Primary Examiner* — Ronald Hinson
(74) *Attorney, Agent, or Firm* — K&L Gates LLP

(57) ABSTRACT

Coil formers having flanges selectedly removed at interface areas with a core can provide advantages of increase a winding window and better heat transfer. The coil former can also have added flanged adjacent to the core to provide added protection to the core. Examples of e-cores and PQ cores are shown.

17 Claims, 16 Drawing Sheets

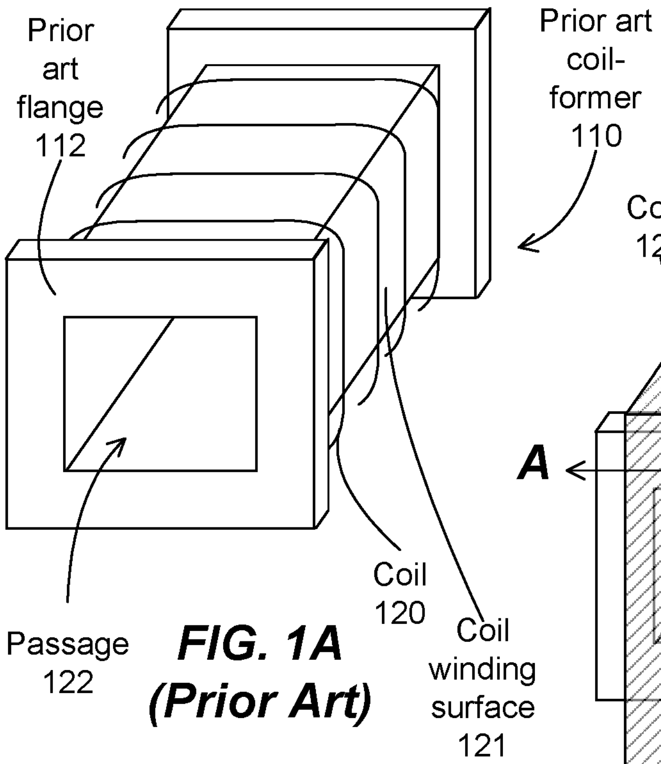
FIG. 1A (Prior Art)
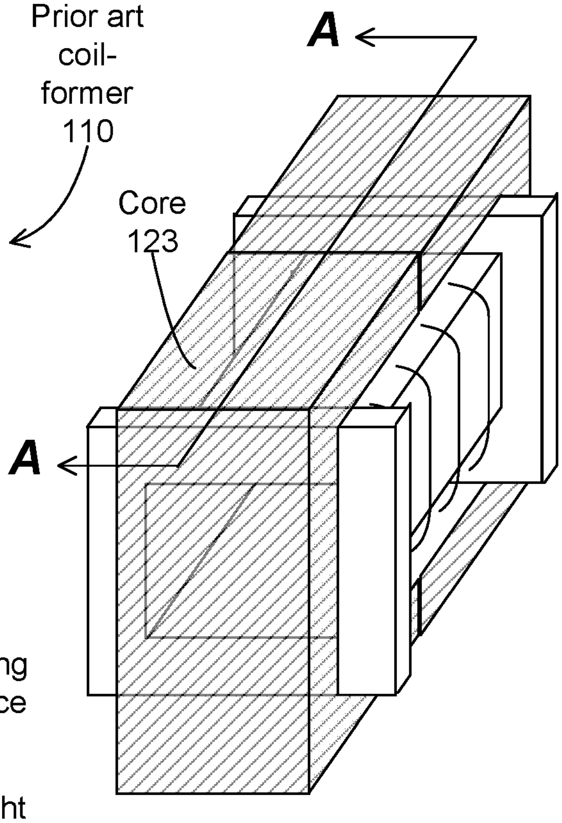
FIG. 1B (Prior Art)
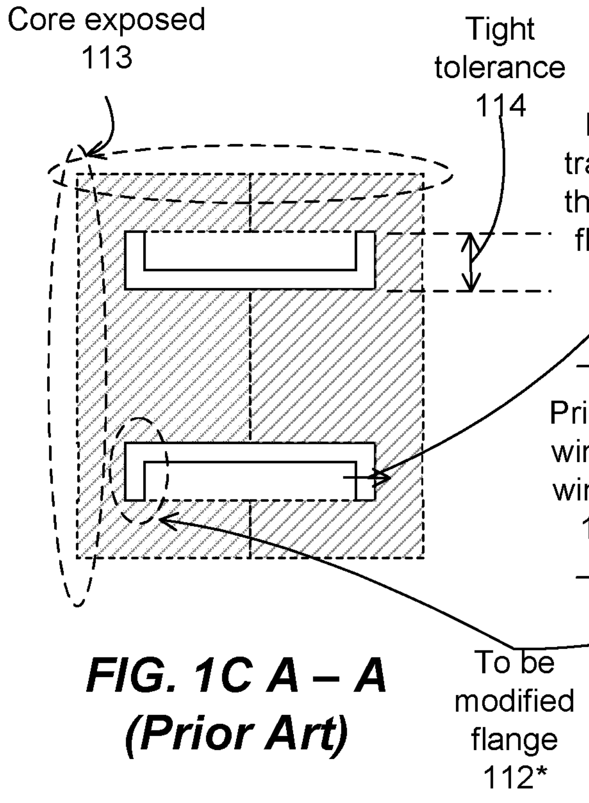
FIG. 1C A – A (Prior Art)
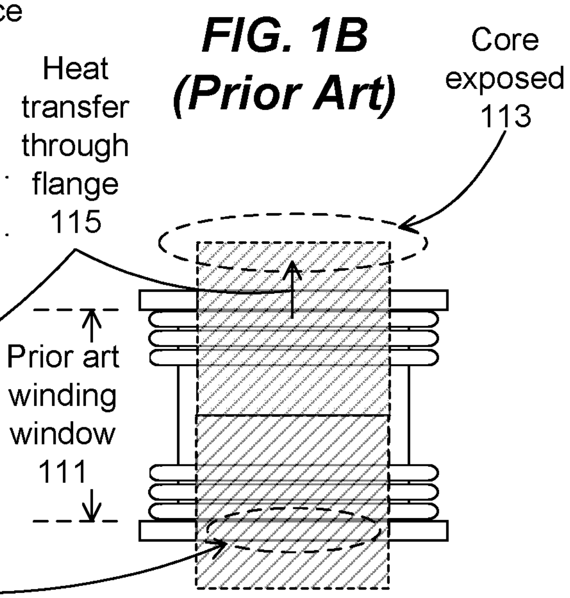
FIG. 1D top view (Prior Art)

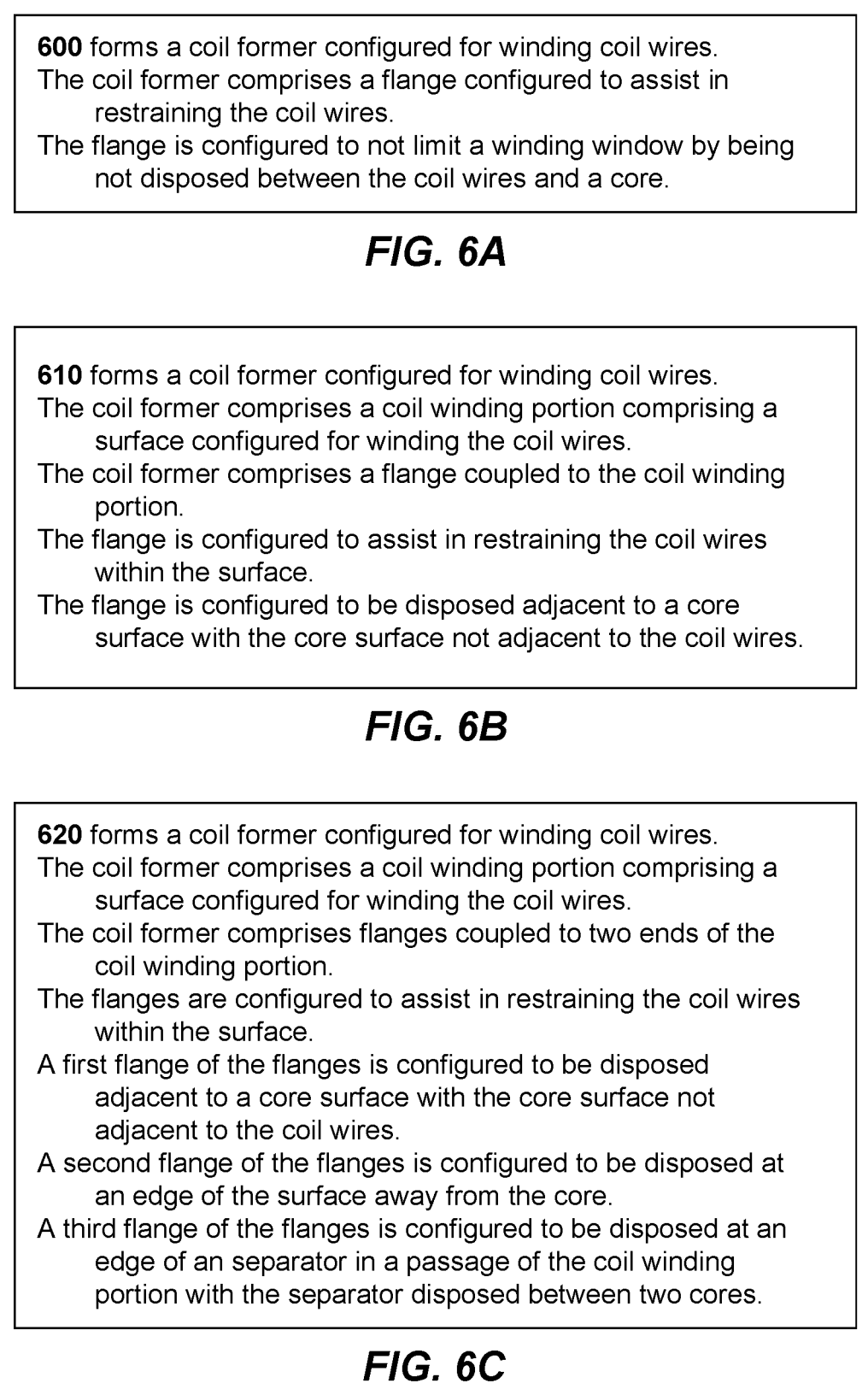

600 forms a coil former configured for winding coil wires.
The coil former comprises a flange configured to assist in restraining the coil wires.
The flange is configured to not limit a winding window by being not disposed between the coil wires and a core.

*FIG. 6A*

610 forms a coil former configured for winding coil wires.
The coil former comprises a coil winding portion comprising a surface configured for winding the coil wires.
The coil former comprises a flange coupled to the coil winding portion.
The flange is configured to assist in restraining the coil wires within the surface.
The flange is configured to be disposed adjacent to a core surface with the core surface not adjacent to the coil wires.

*FIG. 6B*

620 forms a coil former configured for winding coil wires.
The coil former comprises a coil winding portion comprising a surface configured for winding the coil wires.
The coil former comprises flanges coupled to two ends of the coil winding portion.
The flanges are configured to assist in restraining the coil wires within the surface.
A first flange of the flanges is configured to be disposed adjacent to a core surface with the core surface not adjacent to the coil wires.
A second flange of the flanges is configured to be disposed at an edge of the surface away from the core.
A third flange of the flanges is configured to be disposed at an edge of an separator in a passage of the coil winding portion with the separator disposed between two cores.

*FIG. 6C*

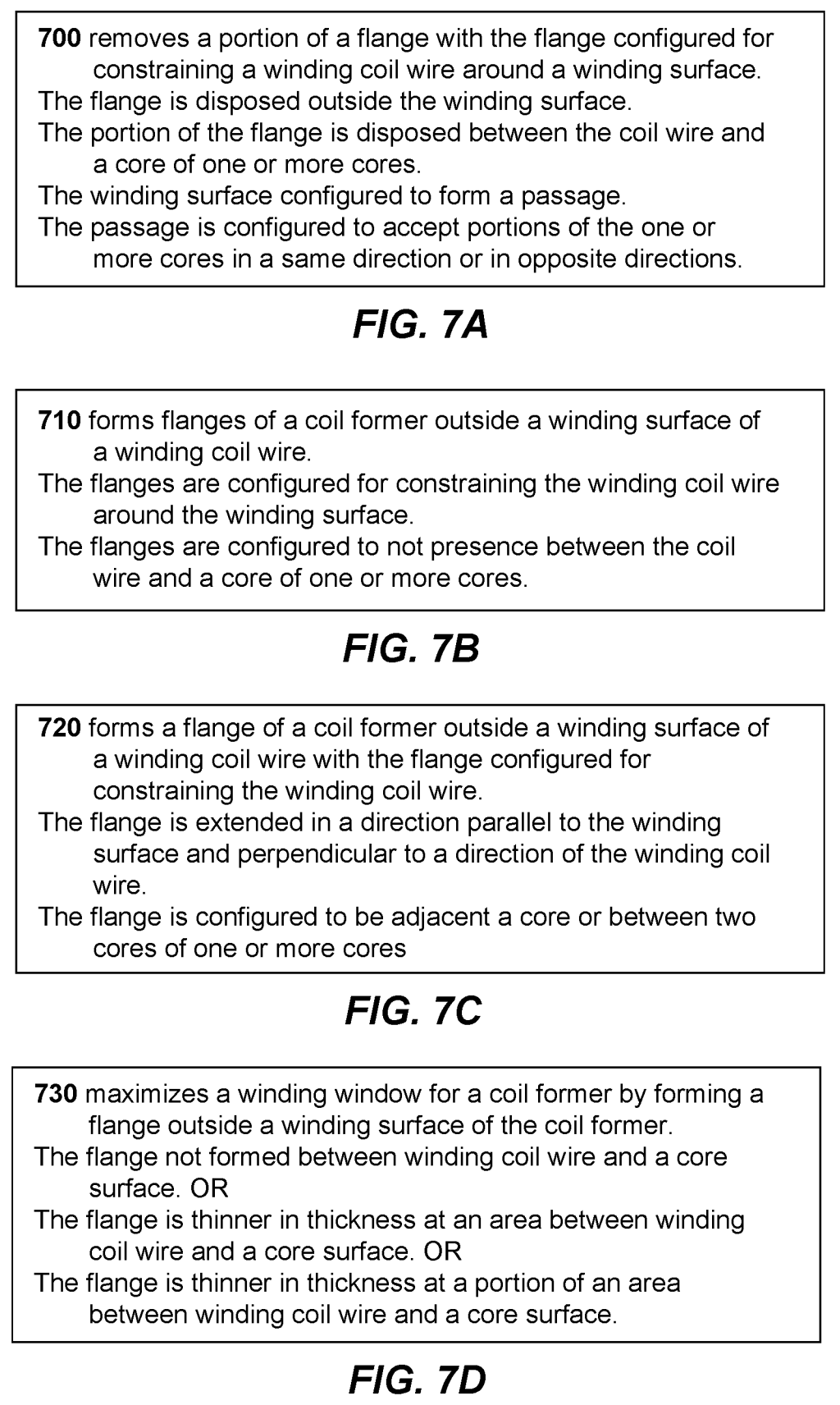

700 removes a portion of a flange with the flange configured for constraining a winding coil wire around a winding surface.
The flange is disposed outside the winding surface.
The portion of the flange is disposed between the coil wire and a core of one or more cores.
The winding surface configured to form a passage.
The passage is configured to accept portions of the one or more cores in a same direction or in opposite directions.

*FIG. 7A*

710 forms flanges of a coil former outside a winding surface of a winding coil wire.
The flanges are configured for constraining the winding coil wire around the winding surface.
The flanges are configured to not presence between the coil wire and a core of one or more cores.

*FIG. 7B*

720 forms a flange of a coil former outside a winding surface of a winding coil wire with the flange configured for constraining the winding coil wire.
The flange is extended in a direction parallel to the winding surface and perpendicular to a direction of the winding coil wire.
The flange is configured to be adjacent a core or between two cores of one or more cores

*FIG. 7C*

730 maximizes a winding window for a coil former by forming a flange outside a winding surface of the coil former.
The flange not formed between winding coil wire and a core surface. OR
The flange is thinner in thickness at an area between winding coil wire and a core surface. OR
The flange is thinner in thickness at a portion of an area between winding coil wire and a core surface.

*FIG. 7D*

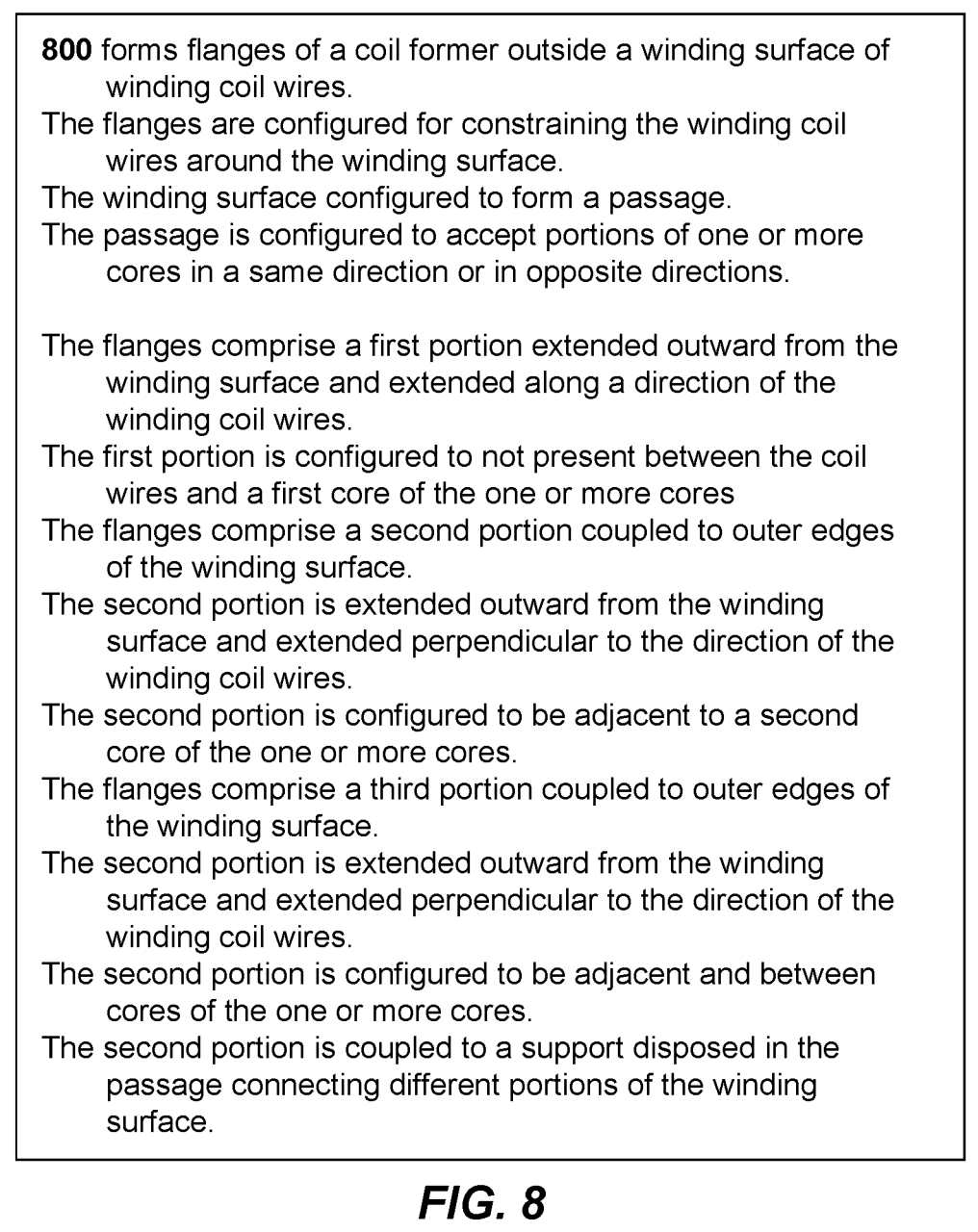

800 forms flanges of a coil former outside a winding surface of winding coil wires.
The flanges are configured for constraining the winding coil wires around the winding surface.
The winding surface configured to form a passage.
The passage is configured to accept portions of one or more cores in a same direction or in opposite directions.

The flanges comprise a first portion extended outward from the winding surface and extended along a direction of the winding coil wires.
The first portion is configured to not present between the coil wires and a first core of the one or more cores
The flanges comprise a second portion coupled to outer edges of the winding surface.
The second portion is extended outward from the winding surface and extended perpendicular to the direction of the winding coil wires.
The second portion is configured to be adjacent to a second core of the one or more cores.
The flanges comprise a third portion coupled to outer edges of the winding surface.
The second portion is extended outward from the winding surface and extended perpendicular to the direction of the winding coil wires.
The second portion is configured to be adjacent and between cores of the one or more cores.
The second portion is coupled to a support disposed in the passage connecting different portions of the winding surface.

*FIG. 8*

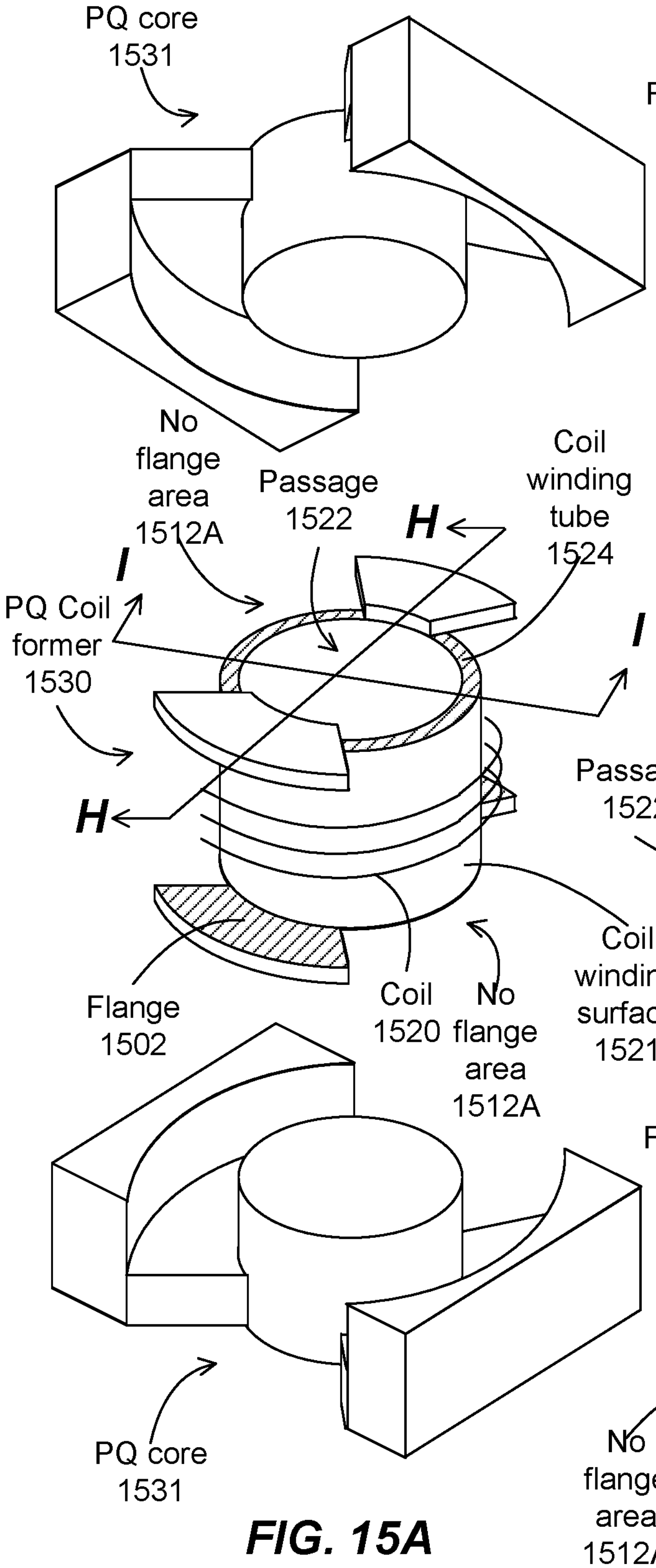
FIG. 15A
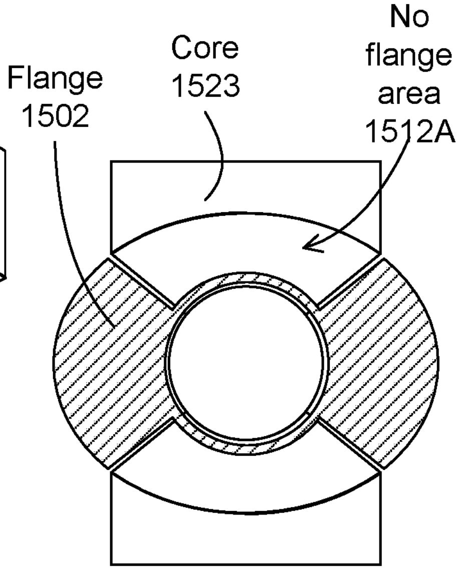
FIG. 15B
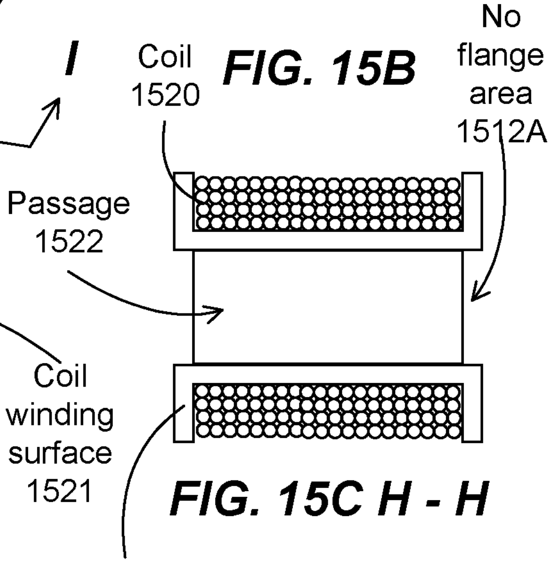
FIG. 15C H - H
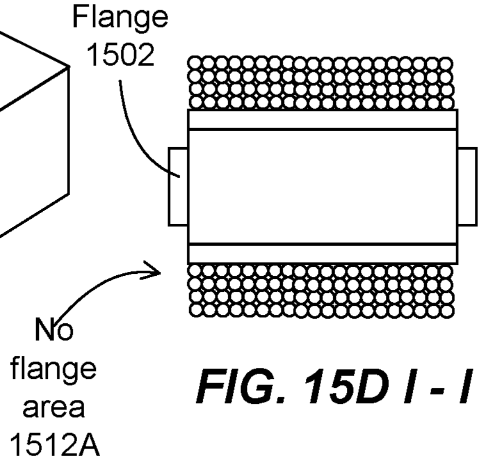
FIG. 15D I - I

COIL FORMER FOR IMPROVED WINDING WINDOW UTILIZATION

The present invention claims priority from U.S. provisional Patent Application Ser. No. 63/441,908, filed on Jan. 30, 2023, hereby incorporated by reference in its entirety.

BACKGROUND OF THE INVENTION

Coil formers for inductive components, such as transformers or electromagnetic relays, can be produced from a plastic material in a one-piece construction to simplify the manufacturing process with compact construction. For example, coil formers configured to support e-cores are common in electrical and electronic circuits.

FIGS. 1A-1D show a configuration for a prior art coil former. As shown in FIG. 1A, the coil former 110 includes a coil winding surface 121, configured to support multiple coils 120, e.g., coil wires wound around the coil winding surface 121. The coil winding surface is also configured to provide a passageway 122, e.g., the coil wires are wound around the passageway 122.

The coil former also includes flanges 112, which is configured to constrain the winding coil wires 120, especially during an automatic wire winding process. For example, the coil wires are wound on the coil winding surface 121, around the outside of the passageway 122 between the outer flanges 112, e.g., the outer flanges 112 are positioned at the ends of the passageway 122.

In FIG. 1B, the passageway 122 of the coil former 110 receives the middle leg of two e-cores 123 in opposite directions. When the middle legs are positioned in the passageway of the coil former, the outer legs of the e-cores are positioned outside the winding coil wires 120. The outer legs are spaced apart from the middle leg to accommodate the outer flanges 112 at the ends of the passageway 122.

Generally, the two e-cores are configured to accommodate the flux density generated by the coils 120 wound around the middle legs of the E-core halves. E-cores are configured with different leg lengths, body widths and body thicknesses for different applications. In general, the cross-sectional area of the outer legs is smaller than or equal to the cross-sectional area of the middle leg to accommodate the generated flux density. Further, a coil former is configured to accommodate commercially available E-cores to avoid the cost of manufacturing custom e-cores.

The prior art coil formers can be less effective, for example, due to a smaller winding window 111, e.g., the surface area 121 on which the winding coil wires 120 are wound. As shown in FIG. 1C, a portion of the outer flanges 112* between the coil wires 120 and the e-cores 123 can reduce the available surface areas for winding the coil wires.

In addition, the outer edges and surfaces 113 of the e-cores are exposed, which can be easily damaged, for example, by collision or mishandling. The distance between the legs of the e-cores has to match with the height of the flanges 112, e.g., there can be small tolerance 114 between the coil formers and the e-cores. The flanges 112 disposed between the winding coil wires 120 and the e-cores 123 can restrict the heat transfer 115 outward from the coil wires.

Thus, there can be a need for improved coil formers.

SUMMARY

Coil formers having modified flanges avoiding no flange areas at interface areas with a core can provide advantages of increase a winding window and better heat transfer. The coil former can also have added flanged adjacent to the core to provide added protection to the core. Examples of e-cores and PQ cores are shown.

Other configurations of the modified flanges can be used, such as thin flanges, gap flanges, or thin gap flanges.

BRIEF DESCRIPTION OF THE DRAWINGS

FIGS. 1A-1D show a configuration for a prior art coil former.

FIGS. 6A-6C illustrate flow charts for forming a coil former according to some embodiments.

FIGS. 7A-7D illustrate flow charts for forming a coil former according to some embodiments.

FIG. 8 illustrates a flow chart for forming a coil former according to some embodiments.

FIGS. 9A-9D illustrate an inductor assembly or a coil assembly having a coil former with added flanges according to some embodiments.

FIGS. 10A-10D illustrate an inductor or coil assembly having a hybrid coil former according to some embodiments.

FIGS. 15A-15D illustrate a coil former configuration for a PQ core inductor according to some embodiments.

DETAILED DESCRIPTION OF THE EMBODIMENTS

Figure 2A:
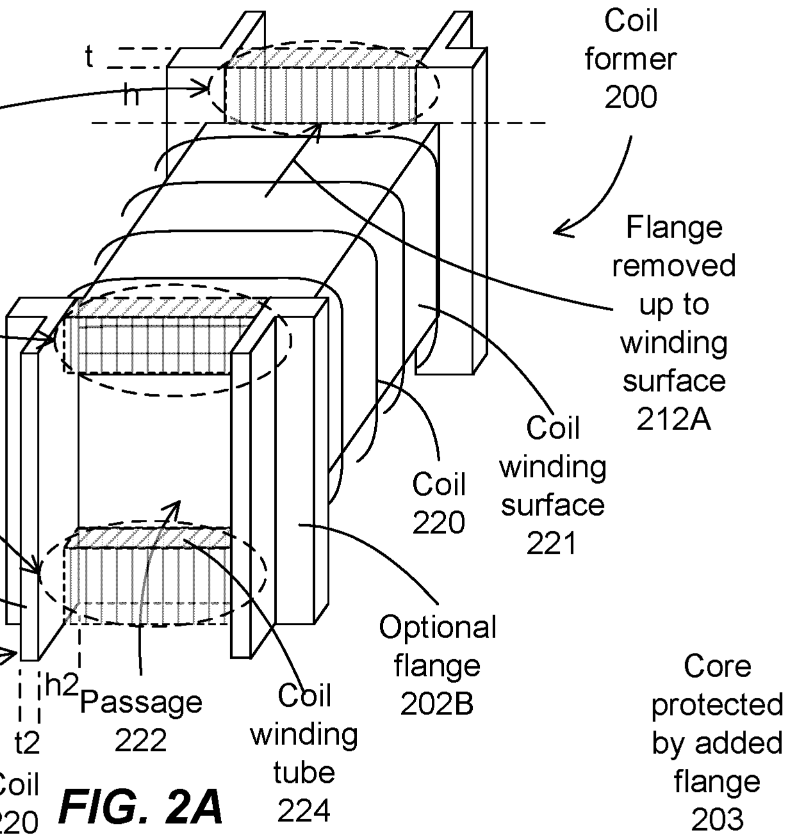
FIGS. 2A-2C illustrate a coil former according to some embodiments.

In some embodiments, the present invention discloses a coil former with an improved winding window, together with an ease of assembly and core protection. The coil former is designed to support coil wires wound around a winding surface of the coil former, with one or more outer flanges for restraining the coil wires. The coil former is also configured to support one or more magnetically active material cores, with the cores configured to guide the magnetic flux.

In some embodiments, the outer flanges are configured to assist in restraining the coil wires within the coil winding surface. With the restraining flanges, the coil former can be used in an automatic wire winding process, to provide a well align set of coils to maximize a magnetic flux.

In some embodiments, the outer flanges, or portions of the outer flanges, of the improved coil former are not to be disposed between the winding coil wires and a core. For example, the coil former can have outer flanges coupled to an edge of the coil winding surface and disposed along a direction parallel to the winding coil wires, with portions of the outer flanges between the winding coil wires and the cores removed.

By removing the flange portions between the winding coil and the cores, the winding window can be increased by at least the thickness of the flange portions. For example, a dimension of a winding surface of a coil former between two outer flanges can be 41 mm. Assuming a flange thickness of 1.5 mm, the winding surface dimension can be increased to 44 mm (41 mm+1.5 mm+1.5 mm) by removing the two flange portions at the outer edges of the winding surface, to achieve a 7% increase in winding window.

In some embodiments, the outer flanges can be completely removed, e.g., there are no outer flanges disposed parallel to the winding coil wires. In some embodiments, portions of the outer flanges can be optionally remained, e.g., the flange portions not disposed between the coil wires and the cores.

In some embodiments, the improved coil former can further include one or more additional flanges disposed at an edge and away from the coil winding surface, e.g., the flanges can be coupled to an edge of the coil winding surface and disposed perpendicular to a direction parallel to the winding coil wires. The portions of the flanges disposed perpendicular to the coil winding surface can be used to constrain the coil wires. The portions of the flanges disposed parallel to the coil winding surface and perpendicular to the winding coil wires can be used to protect the cores.

The additional flanges can be disposed at an edge of the passageway formed by the winding surface, and thus is adjacent to a core partially disposed in the passageway. The adjacent flanges then can protect the exposed surfaces of the cores.

The additional flanges can be disposed within the passageway to separate the passageway into two or more smaller passageways. For example, the coil former can have a long winding coil surface, configured to form a long passageway. An additional flange can be disposed in the passageway, such as at a middle area of the passageway, to partition the passageway into two passageways, two or more additional flanges can be disposed in the passageway to partition the passageway into three or more passageways, In general, the additional flanges can be used to partition the passageway into suitable passageways, such as passageways having dimensions matching available cores.

The additional flanges then can be between and adjacent to two cores partially disposed in two neighbor passageways. The adjacent flanges then can protect the cores against potential damages caused by rubbing the cores together.

The winding coils can be the Tex-E wire coated with an insulated material to meet the requirement of adequate insulation. The wire utilized is typically made from an electric conducting material such as copper, aluminum or similar. The ends of the primary windings and the secondary windings are usually soldered onto primary and secondary pin leads, respectively.

In some embodiments, the flanges can function as core guides, which can be configured to align the core portions inserted to the passage of the coil former. The core portions can be coupled together to enclose the winding coil wires. In some embodiments, the core portions can be coupled together using an adhesive such as glue, tape, or other adhesive.

In some embodiments, the core portions can include a magnetically active core material, such as stainless steel, iron, iron-ferrite or other magnetic core material.

As shown, the core portions are examples of E-cores. However, different core and coil former shapes can be utilized, such as C-cores, block cores, or PQ cores.

Plastics used in bobbin molding fall into two main groups, thermoplastic and thermoset. Thermoplastic materials are the most widely used in bobbin molding and are readily available. Thermoplastic bobbins are inexpensive and capable of meeting many agency heat and flammability requirements when mixed with mineral, quartz, or glass fillers.

Thermoset materials are more expensive but offer the greatest strength and temperature performance. DAP (Dially Phthalate) and epoxy plastics are suitable for toroid mounts and potting cups, but their brittleness makes them unsuited for bobbin applications. Phenolic plastic is well suited for bobbin applications, and they are especially stable in high temperature applications for which they are becoming more popular.

The coil former can be made of injection mold plastic, example PA66. The winding material includes foil winding, HF lit wire, flat wire, or stranded wire. Additional components can be added, such as cooling structure, for example aluminum extrusion or die casting profile. Additional insulating tapes can be added, such as transformer margin tape, potting material, cable ties etc.

Figure 2B:
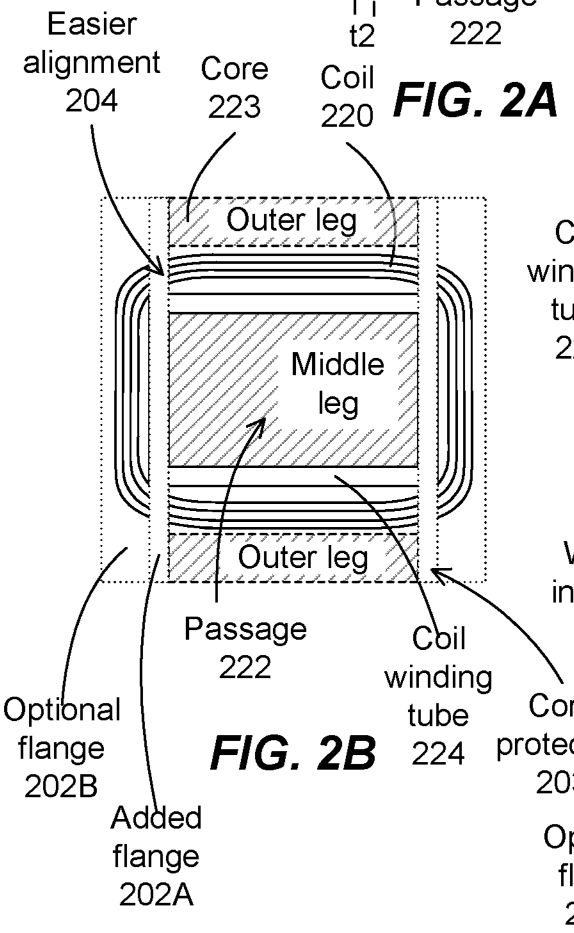
Figure 2C:
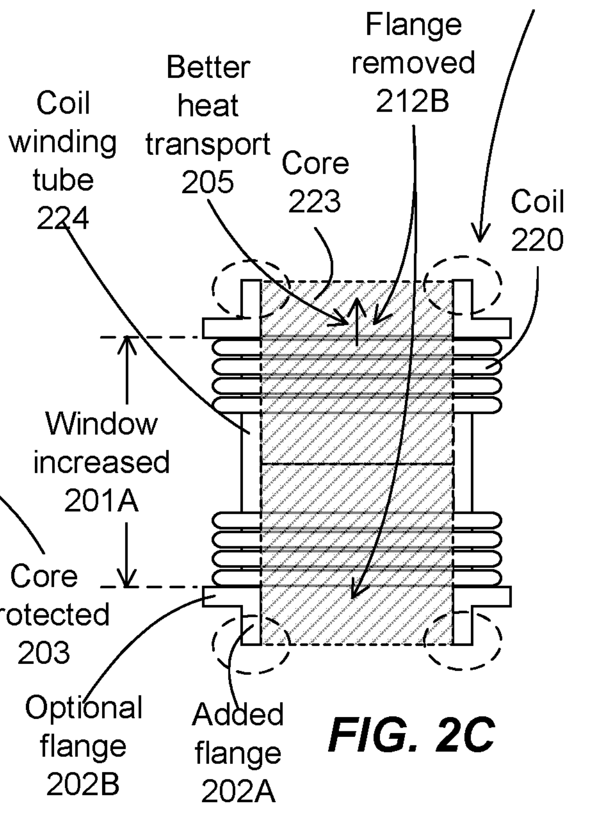

The coil former can increase winding window utilization, easier alignment of E-cores during gluing, better heat transport of outer winding towards e-core (thermal insulation layer of coil-former side wall omitted), and core separation against core cracking during handling FIGS. 2A-2C illustrate a coil former according to some embodiments. In FIG. 2A, the coil former 200 can include a coil winding surface 221, on which coil wires are wound to form coils 220. The coil winding surface 221 can be configured to form a passageway 222, e.g., the coil wires are wound around the passageway 222. The passageway is configured to accept portions of magnetically active material cores, for channeling the magnetic flux generated by the coils 220.

The coil former can include a tube having a winding surface. The winding surface can include a curve surface or a segmented surface having multiple flat or curve surfaces. For example, the winding surface can include 4 segmented surfaces connected at right angles to form the side areas of the tube. The winding surface can include 4 planar surfaces bending at corners to form the side areas of the tube. The winding surface can include a gap with the coil wire wound across the gap on the winding surface.

The winding surface is configured so that the coil wire can be wound on the winding surface up to a boundary edge of the winding surface, e.g., the boundary edge is disposed on a flat surface, e.g., on a flat plane. The coil wire can be wound starting from the boundary edge on the flat plane toward the inner area of the winding surface. Thus, the coil wire, or at least a portion of the coil wire, is exposed so that a core can be assembled with a core surface contacting or in immediate vicinity or immediately adjacent to the coil wire. The winding surface is configured for winding a coil wire with a section of the coil wire contacting or disposing at a vicinity of a flat surface or plane formed by the boundary edge. The boundary edge of the winding surface can form an end of the tube.

In this configuration, without a constraint element, the coil wire can be easily disassembled. Thus the outer flange can be configured to constrain the coil wire at some portions of the boundary edge, while exposing the coil wire at some other portions of the boundary edge.

The exposed portions include the boundary edge portions that face a core surface, e.g., there is no flange component disposed between the coil wire and the core. The constraint portions include the boundary edge portions that are outside the core.

In some embodiments, the coil former can have outer flanges, such as optional flange 202B, disposed at ends and outside of the coil winding surface 221, e.g., the outer flanges being moved outward 212A with removed portions so that the outer flanges are to be in contact but out of the coil winding surface area, e.g., the outer flanges 202B are configured to restrain or constrain the coil wires 220, but not to reduce the coil winding surface area. For example, the surface for winding the coil wire includes a boundary edge of the surface, e.g., the coil wire can be wound on the winding surface at the boundary edge without any surface without the coil wire, e.g., the winding surface is reachable by the coil wire without any portion protruded from the coil wire area and not covered by the coil wire.

The outer flanges can be configured to be running along the direction of the coil wires 220 around the passageway, e.g., following the coil winding surface to retrain the coil wires to be within the coil winding surface area. The outer flanges can be running around at least a portion of the passageway, e.g., the portion of the passageway that does not put the outer flanges between the cores and the coil wires. While running along the portion of the passageway, the outer flanges extend in a direction perpendicular to the coil winding surface to retrain the coil wires at all portions of the outer flanges.

The outer flanges can have a thickness t extending outward from the coil winding surface, such as less than 3 mm thick, between 1 and 3 mm thick, between 1 and 2 mm thick, or about 1.5 mm thick. The outer flanges can have a height h measured from the coil winding surface in a direction perpendicular to the coil winding surface. The height h is configured to accommodate the coil wires, e.g., the more the number of coils, the larger the height is.

The outer flanges 202B can be configured with at least portions 212B of the flanges removed. During assembly, a core 223 can be placed to surround the coils 220, such as an e-core 223 having a middle leg inside the passageway 222 and two outer legs outside the coils 220. By removing the portions 212B of the outer flanges so that the cores directly contact the coil winding surface and the coil wires, there can be no reduction of the winding window, e.g., no reduction of the coil winding surface. Thus, the outer flanges can be configured so that there is no flange portions disposed between the cores and the coil wires, or so that the cores directly contact the coil wires.

In some embodiments, the outer flanges 202B can be configured with more than the minimum removal of the flange portions disposed between the cores and the coil wires. For example, the outer flanges can be optional, e.g., the whole outer flanges are removed to increase the winding window for the coil wires. Alternatively, portions of the outer flanges can be present for constraining the coil wires to be within the coil winding surface.

The outer flange can be coupled to a portion of the boundary edge of the winding surface, with the flange extended from the boundary edge portion for constraining the coil wire within the winding surface. The outer flange can include a first portion extending from a boundary edge portion in a direction comprising a component perpendicular to a portion of the winding surface including the boundary edge portion. The outer flange can include a second portion extending from the boundary edge portion in a direction comprising a component parallel to the winding surface portion.

The outer flange is also configured to expose a portion of the coil wire section and a portion of the boundary edge, with the portion of the coil wire section disposed on a portion of the winding surface including the boundary edge portion. For example, the outer flange is configured to enable a core to be immediately adjacent to the coil wire, e.g., there is no flange portion or the outer flange is configured to be not present or absent between the core and the coil wire, e.g., the coil wire is exposed so that a core can be assembled with a core surface contacting or immediately adjacent to the coil wire.

In some embodiments, additional flanges 202A can be added for constraining the coil wires within the coil winding surface, for example, to assist in an automatic coil winding process. The additional flanges 202A are configured to be not disposed between the cores and the coil wires, such as away from the cores. For example, the additional flanges can be disposed at a side of the core, such as extending away from the coil winding surface 221. The additional flanges can form an angle, e.g., no parallel, to the outer flanges 202B. For example, the additional flanges can be perpendicular to the outer flanges.

In some embodiments, the additional flanges are extended perpendicular to the coil winding direction, e.g., also perpendicular to the outer flanges. The additional flanges can be extended in a direction perpendicular to the coil winding surface for constraining the coil wires. The additional flanges can be extended in a direction parallel to the coil winding surface to be parallel with the cores, and can serve to protect the cores.

The additional flanges can be configured to be running along the direction of the coil wires 220 around at least a portion of the passageway, similar to the outer flanges. While running along the portion of the passageway, the additional flanges extend in a direction parallel to the coil winding surface.

The additional flanges also extend in a direction perpendicular to the coil wires when the coil wires change direction to be perpendicular to the additional flanges. Thus, the additional flanges can restrain the coil wires at two ends of the additional flanges.

The additional flanges can have a thickness t2, such as less than 3 mm thick, between 1 and 3 mm thick, between 1 and 2 mm thick, or about 1.5 mm thick. The additional flanges can have a height h2. The height h2 is configured to accommodate the cores. The additional flanges can have a second height h, which can be the same or different from the height h of the outer flanges. The height h of the additional flanges can be used for constraining the coil wires.

The coil former can include an additional flange coupled to a portion of a boundary edge of the winding surface. The additional flange can be extended from the boundary edge portion in a direction including a component parallel to the winding surface, e.g., to the portion of the winding surface that includes the boundary edge portion. The addition flange can also extend beyond the boundary edge portion for constraining the coil wires within the winding surface.

The additional flange can be extended from the winding surface, e.g., from a portion of the winding surface, to contact a surface of a core, e.g., an exposed core surface not adjacent to the coil wire FIG. 2B shows a cross sectional view of the coil former assembled with a core 223, such as an e-core having a middle leg and two outer legs. The coil former can have a coil winding surface surrounding a passageway 222, such as a coil winding tube 224. The coil winding tube can have an outer surface configured for winding core wires, e.g., a coil winding surface. The coil winding tube can have a hollow interior configured to accept a portion of a core, such as the middle leg of an e-core, e.g., a passageway. The coil wires are wound around the coil winding tube 224, with the top and bottom portions of the coils 220 disposed between the legs of the e-core. There can be portions of the coils, such as the left and right portions, which are disposed without having a core for channel the magnetic flux.

The coil former with the coil wire and assembled with one or more cores can form a coil assembly, such as a transformer. The coil assembly can include a coil former, a coil wire wound on the coil former and configured to generate a flow of magnetic flux, and one or more cores coupled to the coil former and configured to improve the magnetic flux flow.

The outer flanges 202B can be disposed at some portions of the coils, e.g., the left and right portions, for constraining the coil wires, and for not reducing the winding window of the coil wires. The outer flanges 202B can be disposed running along the left and right portions of the coils 220 and extending outward away from and perpendicular to the coil winding surface for constraining the coil wires. The outer flanges 202B is absent at some portions of the coils, e.g., the top and bottom portions, for not reducing the coil winding surface, e.g., the winding window of the coil wires.

In some embodiments, the outer flanges 202B can be optional, or can be reduced. The outer flanges can be configured for protecting 203 the core or the coils.

The additional flanges 202A can be disposed at some portions of the coils, e.g., the left and right portions. The additional flanges 202A can be disposed running along the left and right portions of the coils 220, and extending outward away from and parallel to the coil winding surface. Only end portions of the additional flanges can be used for constraining the coil wires, e.g., the portions that block the coils. The middle portion of the additional flanges runs parallel to the coil winding surface, and does not serve to constrain the coil wires.

In some embodiments, the additional flanges 202A can be disposed adjacent to the core 223, such as two additional flanges at two sides of the core 223. The additional flanges thus can protect the cores against damages caused by collision, for example, by dropping.

FIG. 2C shows a top view of the coil former assembled with two cores 223. The coil former can have a coil winding tube 224 with the outer surface having coils 220 and the inner passageway accepting cores 223. The coils are wound around the coil winding tube 224, with the top and bottom portions of the coils 220 disposed between the legs of the cores. There can be portions of the coils, such as the left and right portions, which are disposed without having a core for channel the magnetic flux.

The outer flanges 202B can be disposed at some portions of the coils, e.g., the left and right portions, for constraining the coil wires, and for not reducing the winding window of the coil wires, e.g., the winding window 201A is increased. The outer flanges 202B can be disposed extending from the left and right portions of the coils 220, e.g., extending outward away from and perpendicular to the coil winding surface for constraining the coil wires. The outer flanges 202B are removed 212B at some portions of the coils, e.g., the top and bottom portions, for not reducing the coil winding surface, e.g., the winding window of the coil wires.

The removal of the outer flange portions can provide better heat transport from the coils to the cores.

The additional flanges 202A can be disposed at some portions of the coils, e.g., the left and right portions. The additional flanges 202A can be disposed perpendicular to the outer flanges 202B. The additional flanges 202A can extend outward away from and parallel to the coil winding surface. Only end portions of the additional flanges can be used for constraining the coil wires, e.g., the portions that block the coils.

In some embodiments, the additional flanges 202A can be disposed adjacent to the core 223, such as two additional flanges at two sides of the core 223. The additional flanges thus can protect 203 the cores against damages caused by collision, for example, by dropping.

Figure 3A:
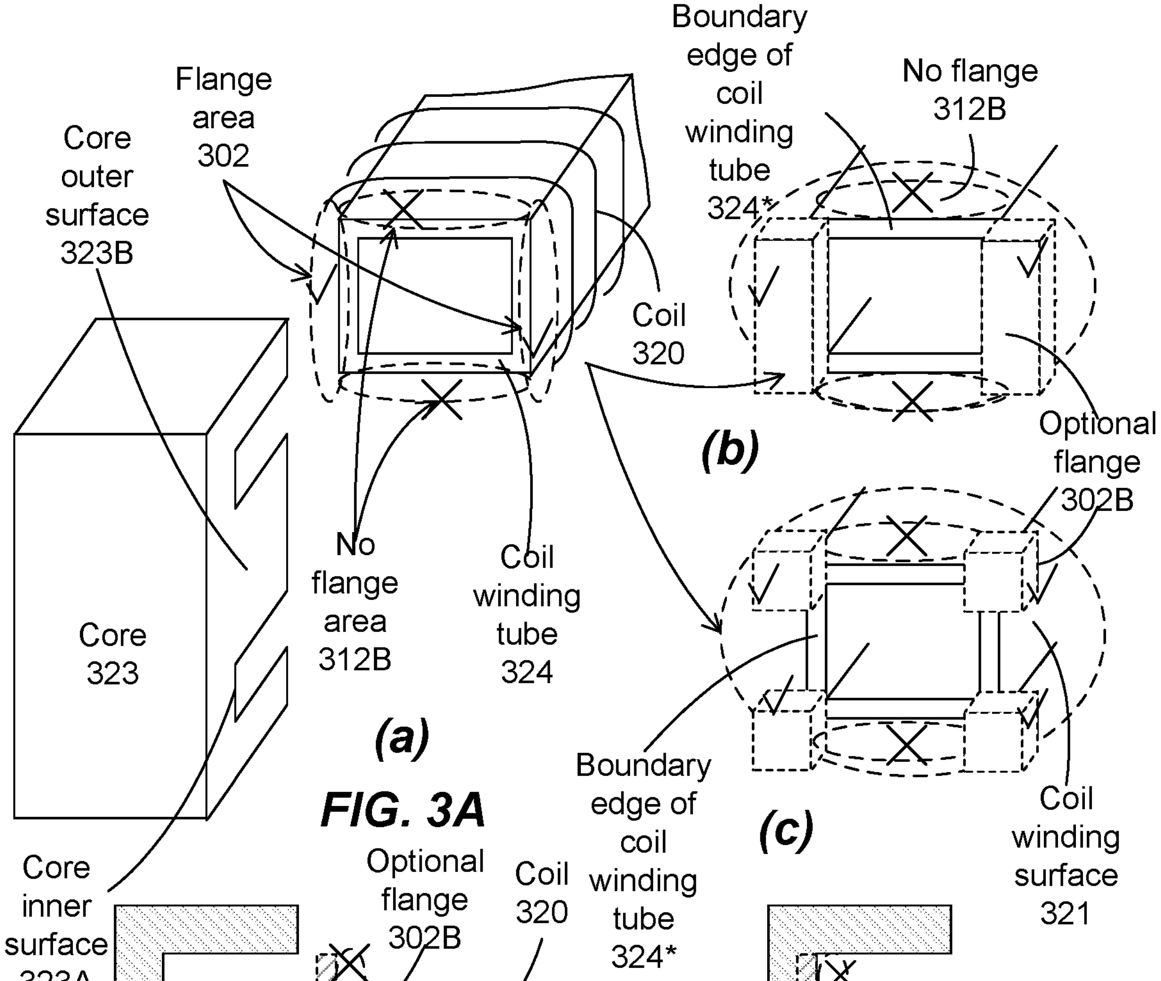
FIGS. 3A-3B illustrate a coil former with added and removed flanges according to some embodiments.
Figure 3B:
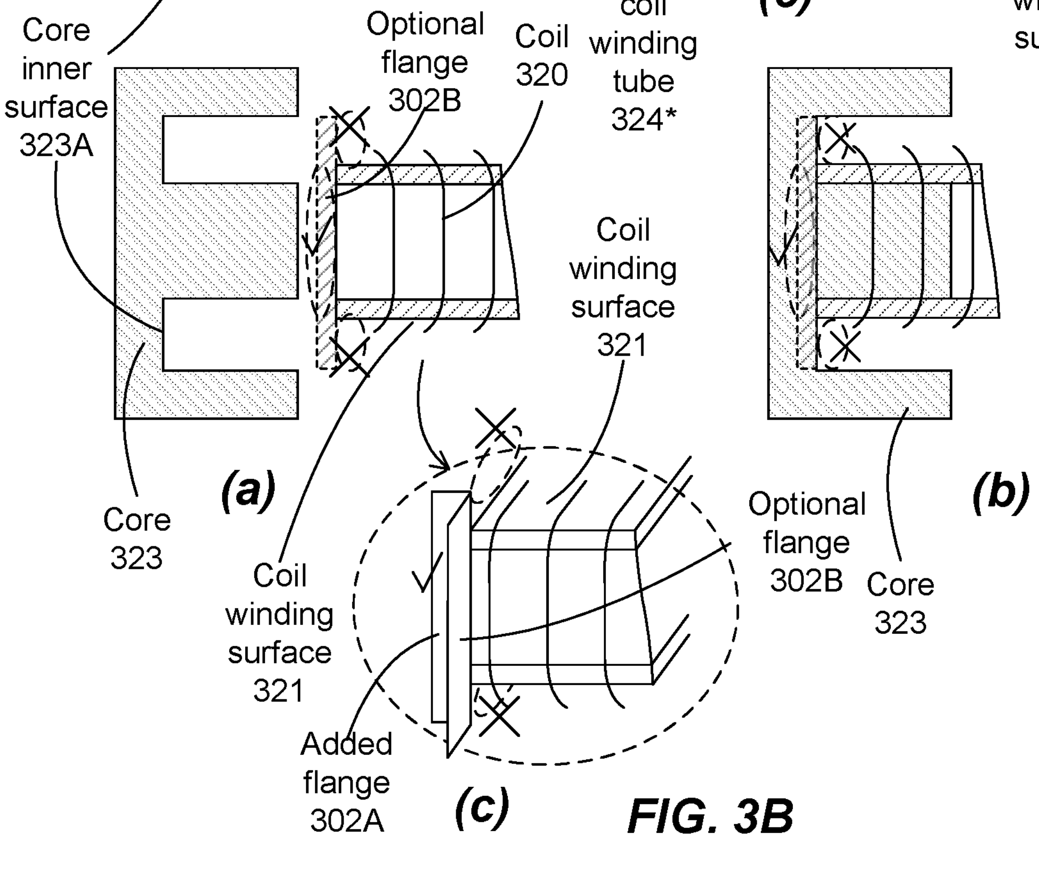

FIGS. 3A-3B illustrate a coil former with added and removed flanges according to some embodiments. There can be flange areas 302 and no flange areas 312B.

A coil former can include a coil winding tube 324, e.g., a tube having outer surface configured for winding a coil wire 320. As shown, the winding surface includes a segmented surface having 4 planar segmented surfaces connected at right angles to form the side areas of the tube.

The coil wire can be wound on the winding surface up to a boundary edge of the winding surface, e.g., the boundary edge is disposed on a planar surface. As shown, the boundary edge forms a rectangular area that forms an end of the tube. The coil wire can be wound starting from the boundary edge toward the inner area of the winding surface.

By winding the coil wire at the boundary edge, the coil wire can be exposed, e.g., a core can be assembled with a core surface contacting or in immediate vicinity or immediately adjacent to the coil wire. The exposed coil wire can allow a core to be assembled with a core surface immediately adjacent the coil wire. Thus, there can be areas 312B without a flange area in order for the coil wire to be exposed, e.g., to allow the exposed coil wire to interface with a core.

In this configuration, e.g., without a constraint flange, the coil wire can be easily disassembled. Thus there can be flange areas 302 which are configured to constrain the coil wire. The flange areas 302 are also configured to be away from the core, such as immediately adjacent to an outer side surface of a core or outwardly extended outside of the core.

For example, in FIG. 3A(a), there are no flange areas 312B so that the coil wire at the no flange area can be exposed, e.g., the exposed coil wire can be contacting or immediately adjacent or in an immediate vicinity of an inner area 323A of a core 323. When the core 323 is assembled into the passage way of the tube, the inner area 323A of the core can contact the exposed coil wire.

There can be flange areas 302 so that the coil wire at the boundary edge can be constrained, e.g., not disassembled. The flange areas 302 can be outside the assembled core, such as optional flanges 302B extending outward away from the core outer surface 323B or added flange 302A running parallel and adjacent to the core outer surface 323B.

FIG. 3A(b) shows a configuration of an optional flange 302B. The optional flange is coupled to a portion of a boundary edge 324* of the winding tube 324, e.g., the boundary edge portions that allow flange areas 302. The optional flange is extended from the boundary edge portion left and right away, e.g., perpendicular, from the winding surface that contains the boundary edge portion. The extended portion of the optional flange can serve to constrain the coil wire.

FIG. 3A(c) shows another configuration of an optional flange 302B. The optional flange is coupled to sections of a portion of a boundary edge 324*. The optional flange is extended from the boundary edge portion up and down away, e.g., parallel, from the winding surface that contains the boundary edge portion. The extended portion of the optional flange can serve to constrain the coil wire.

FIGS. 3B(a) and 3B(b) show cross section views of the optional flange 302B and areas of no flange. FIG. 3B(a) shows a disassembly state and FIG. 3B(b) shows an assembly state of a core 323 with the coil former. FIG. 3B(c) shows a perspective view of the optional flange 302B, added flange 302A, and areas of no flange. The optional flange 302B is configured to extend away from the core outer surface 323B. The added flange 302A is configured to extend along the core outer surface 323B. The areas of no flange are configured to expose the coil wire to the core inner surface 323A.

Figure 4A:
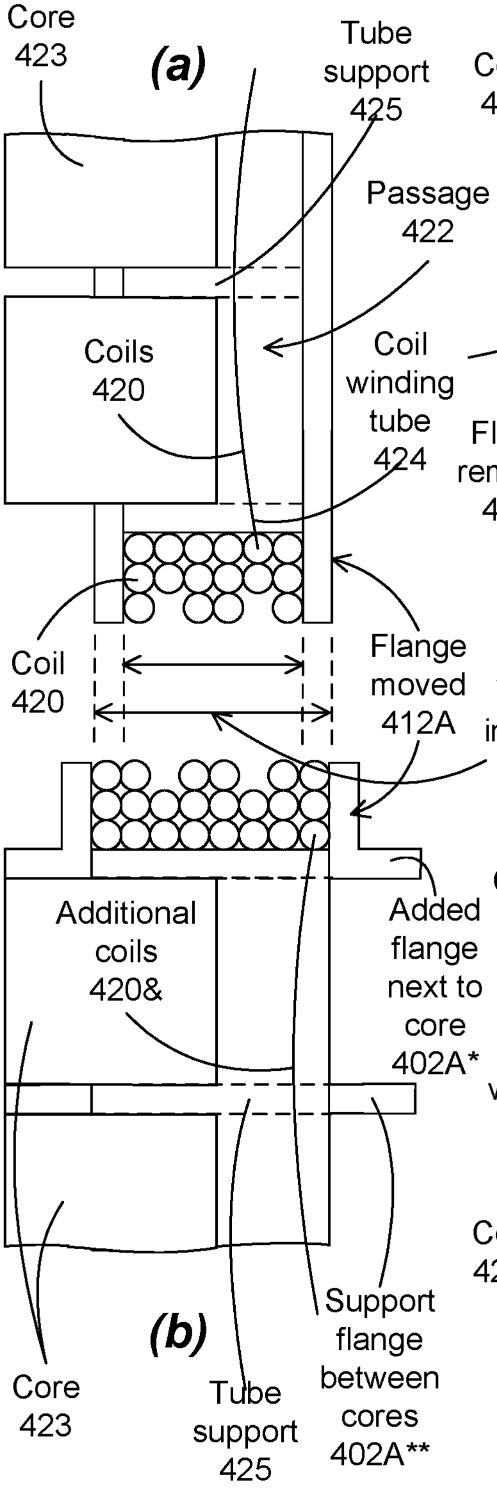
FIGS. 4A-4B illustrate a coil former with an increased winding window according to some embodiments.
Figure 4B:
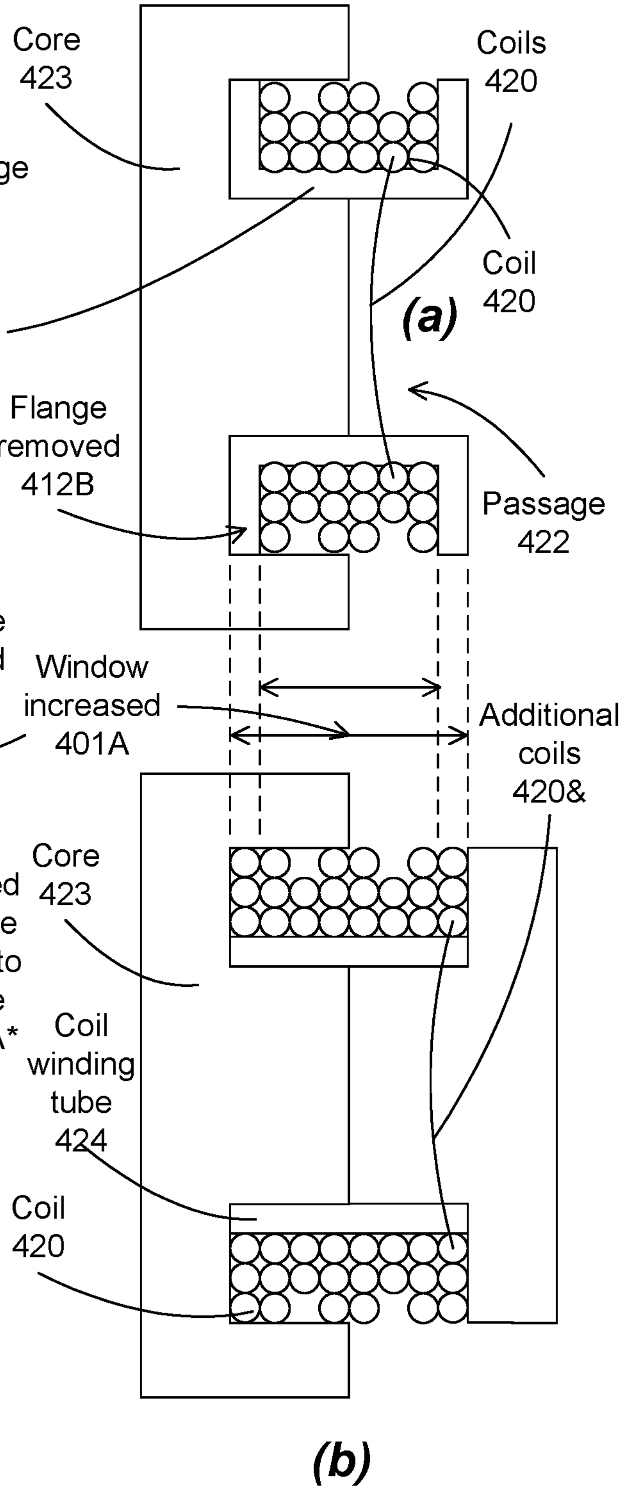

FIGS. 4A-4B illustrate a coil former with an increased winding window according to some embodiments. By removing flange portions, or by not having flanges in certain areas of the coil former, the coil former can have an increased winding window. FIGS. 4A(a) and 4B(a) show top and side views of coil former with flanges disposed between the coil wire and the core surface, respectively. FIGS. 4A(b) and 4B(b) show top and side views of coil former with flanges removed between the coil wire and the core surface, respectively. There can be more surfaces on the coil former for winding the coil wire, e.g., an increased winding window, with the flanges removed in areas between the coil wire and the core surface.

FIGS. 4B(a) and 4B(b) show side cross sectional views of coil assemblies having core 423 assembled with a coil former having a coil wire 420 wound on a winding surface of the coil former. Coils 420 are shown, with circles depicting the cross sectional areas of the coil and line depicting the coils across the tube. The cores are e-cores, meaning the cores have a capital letter E shape. The side cross sectional view of the e-cores is shown, showing the E shape.

A hollow coil winding tube 424, e.g., the tube of the coil former having a coil winding surface, is shown, with a passage 422 in the hollow tube configured for accepting the e-cores, e.g., the middle protrusion of the E-shape cores. Only the left e-cores are shown, with the right e-cores at least partially removed.

In FIG. 4B(a), there are flanges 412B at areas between the coil wire and the core surface, while the flanges 412B are removed in FIG. 4B(b). With the flanged 412B removed, the surface for winding the coil wire increases, resulting in an increase of the winding window 401A, since the coil wire can be wound on a portion of the surface normally occupied by the flanges 412B. For example, there can be additional coils 420&, formed by the coil wire wound on the increased winding window 401A.

FIGS. 4A(a) and 4A(b) show top cross sectional views of coil assemblies having multiple cores 423 assembled with a coil former having a tube support 425 disposed in the passage 422. Coils 420 are shown, with circles depicting the cross sectional areas of the coil and line depicting the coils across the tube.

The tube support is configured to provide support for the winding surfaces of the tube, with two cores assembled separating by the tube support. With e-cores, the top cross sectional view of each core shows a rectangular shape.

The cores are partially inserted into the passage 422, e.g., the middle protrusion of the E-shape cores is assembled inside the passage 422. Only the left e-cores are shown, with the right e-cores removed.

In FIG. 4A(a), there are flanges 412B at areas between the coil wire and the core surface, while the flanges 412B are removed in FIG. 4A(b). With the flanged 412B removed, the surface for winding the coil wire increases, resulting in an increase of the winding window 401A, since the coil wire can be wound on a portion of the surface normally occupied by the flanges 412B. For example, there can be additional coils 420&, formed by the coil wire wound on the increased winding window 401A.

Thus, by removing portions of the flanges configured to constrain the coil wire, there can be more surface area to wind the coil wire, resulting in an increase of the winding window in coil formers having a same total size. Other portions of the flanges can still be useful for constraining the coil wire, to ensure that the coils formed by the coil wire remain in place without being disassembled due to lack of constraining.

An innovation of the present coil former is to remove selective portions of constraining flanges, e.g., flanges designed to constrain the coil wire to keep the shape of the coils formed by winding the coil wire. For example, by removing the flange portions in areas between the core and the coil wire, the coil wire can be wound in the removed flange portions, resulting in an increase of a number of coils, which can lead to higher magnetic flux.

Further, the removal is selective to keep the coils in shape. For example, the flange portions at corners of the coil winding tube are not removed, since the coils can be easily unraveled at the tube corners. The flange portions between the corners can be removed, since the coil wire is wound straight between the corners and is unlikely to be unraveled.

For long straightly wound line, additional constrain can be used, for example, in the form of support flange 402A. For example, tube supports 425 can be added to support the tube having long winding surfaces. The tube supports 425 can be extended in a direction having a component perpendicular to the winding surface to form the support flanges 402A**** to constrain the coil wire. The support flanges are confined in a same plane as the tube supports, and therefore do not interfere with the assembling of the cores to the coil former.

Figure 5A:
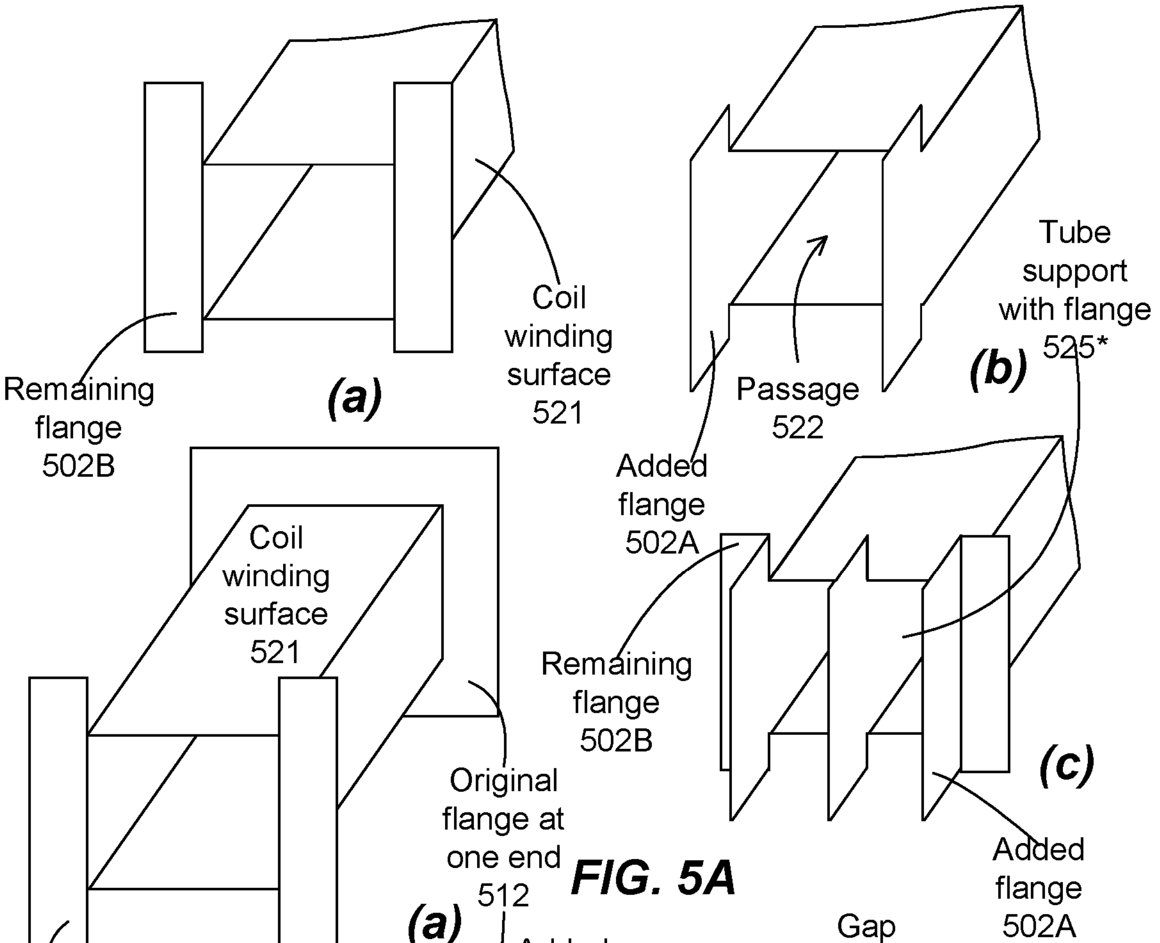
FIGS. 5A-5C illustrate coil former configurations with added and optional flanges according to some embodiments.
Figure 5B:
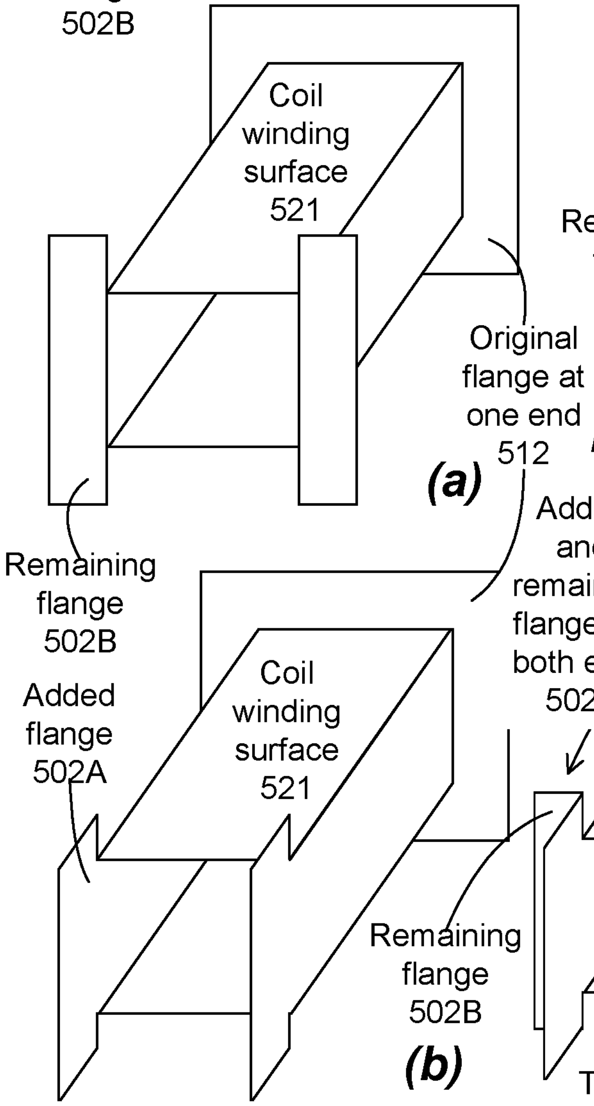
Figure 5C:
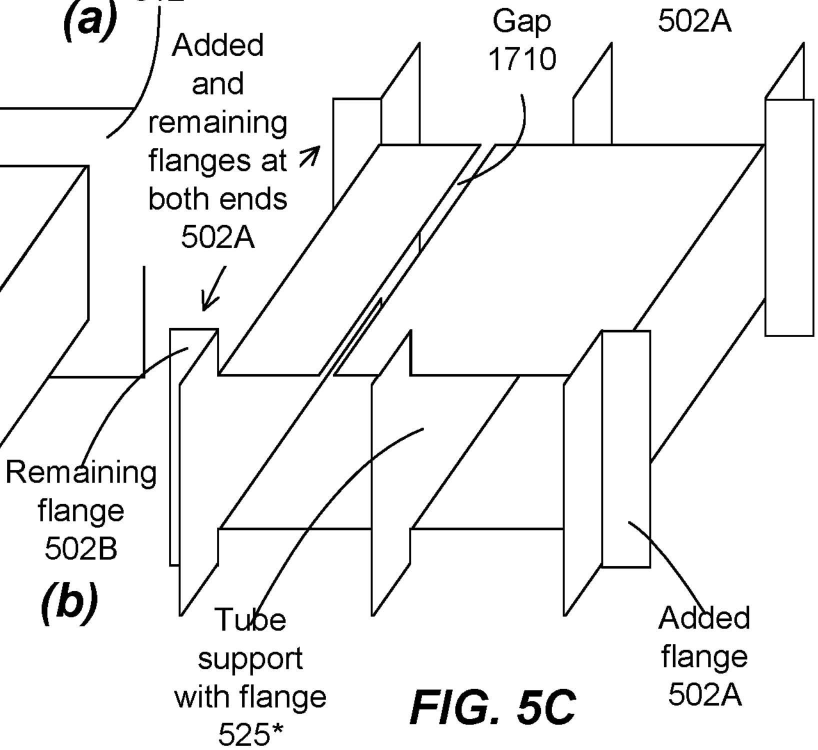

FIGS. 5A-5C illustrate coil former configurations with added and optional flanges according to some embodiments. Different flange configurations can be used for coil formers. The coil former can include a coil winding tube having a winding surface for winding a coil wire. The tube can have original flanges at both ends for constraining the coils formed by winding the coil wire on the coil winding surface 521.

In some embodiments, the original flanges can be modified to form remaining flanges, or optional flanges are discussed or described above. In the optional or remaining flanges, portions of the original flanges can be removed, for example, at areas between the coils and the cores, leaving only remaining portions at areas outside the cores for constraining the coils.

Added flanges can be added for constraining the coils and for protecting the cores. For example, the added flanges can be disposed on both sides of a core, e.g., on external surfaces of the core to protect the core.

Support flanges can be added to the supports of the coil former for constraining the coils and for protecting the cores. For example, the support flanges can keep the coil shape when the coil wire is wound a long distance between corners. In addition, the support flanges can be present between the cores to protect the cores against rubbing each other.

FIGS. 5A(a), 5A(b), and 5A(c) show different flange configurations at one first end of a coil winding tube. The opposite tube end can have a same or a different flange configuration as the flange configuration at the first end.

FIG. 5A(a) shows a flange configuration of a remaining or optional flange 502B. The remaining flange configuration can be an original flange configuration with portions of the original flanges removed. The original flange configuration can be a flange configuration with flanges completely surrounding a periphery of the tube, For example, the removal portions can be the top and bottom portions of the flanges as shown, with the remaining flanges forming the right and left sides. The corner flange portions can remained, e.g., in the remaining flanges, for example, to constrain the coils at corners of the tube.

With the top and bottom portions removed, an e-core can be used with the remaining flange configuration, similar to the case of the original flange configuration. Different from the original flange configuration, the remaining flange configuration can have a larger winding window, due to the coil wire winding on the surface areas of the removed flange portions.

FIG. 5A(b) shows a flange configuration of an added flange 502A. The added flange configuration can include one or more additional flanges extending from side winding surfaces of the tube. The added flange can protrude at the top and at the bottom, e.g., extending pass the top and bottom winding surfaces for constraining the coils at the corners of the tube, similar to the remaining flanges. The added flange can be extended to be at a same size or slightly larger than that of the core to protect the core. For example, the added flanges can be present at both sides of the core, and can be large enough to cover the external surfaces of the E side of the core.

FIG. 5A(c) shows a flange configuration of an added flange 502A together with a remaining flange 502B. The added flange and the remaining flange are present at left and right sides of the tube. In addition, there can be a support flange 525* coupled to a support that is used to support the top and bottom winding surfaces of the tube. The support and support flange are disposed between the added flange and the remaining flange. There is one support and one support flange as shown, but more than one support and support flanges can be used.

The opposite end of the tube can have similar or different flange configurations. For example, a tube can have remaining flanges at both ends. Alternatively, a tube can have a remaining flange at one end and a combination of remaining and added flanges at the opposite end.

FIGS. 5B(a) and 5B(b) show different flange configurations at both ends of a coil winding tube, with one tube end having original flanges. FIG. 5B(a) shows a coil winding tube having a remaining flange configuration 502B at one end and an original flange configuration 512 at the opposite end. FIG. 5B(b) shows a coil winding tube having an added flange configuration 502A at one end and an original flange configuration 512 at the opposite end.

FIG. 5C shows a flange configuration at both ends of a coil winding tube, with tube supports for supporting top and bottom surfaces of the tube. The flange configurations at both ends of the tube include a remaining flange configuration and an added flange configuration, A support having a support flange 525* is disposed between the added and remaining flanges for supporting two separate portions of the winding surface, such as supporting the top and bottom winding surfaces. The support flange can extend outside the tube end with a portion extended in directions comprising a component perpendicular to the top and bottom winding surfaces.

In some embodiments, the tube can have a close-loop winding surface, e.g., a cut through the tube can result in a close-loop curve. For example, the tube can be a circular tube or a rectangular tube. Alternatively, the tube can have a gap 1710 on the winding surface. The winding surface can include a gap with the coil wire wound across the gap on the winding surface.

FIGS. 6A-6C illustrate flow charts for forming a coil former according to some embodiments. In FIG. 6A, operation 600 forms a coil former configured for winding coil wires. The coil former comprises a flange configured to assist in restraining the coil wires. The flange is configured to not limit a winding window by being not disposed between the coil wires and a core. For example, the flange is configured to allow a core to directly contact the surface that the coil wires are wound. Alternatively, the flange is configured to allow the core to directly contact the coil wires.

In FIG. 6B, operation 610 forms a coil former configured for winding coil wires. The coil former comprises a coil winding portion comprising a surface configured for winding the coil wires. The coil former comprises a flange coupled to the coil winding portion. The flange is configured to assist in restraining the coil wires within the surface. The flange is configured to be disposed adjacent to a core surface with the core surface not adjacent to the coil wires. The flange is configured to be extended from the coil winding surface to be in parallel with a surface of the core.

In FIG. 6C, operation 620 forms a coil former configured for winding coil wires. The coil former comprises a coil winding portion comprising a surface configured for winding the coil wires. The coil former comprises flanges coupled to two ends of the coil winding portion. The flanges are configured to assist in restraining the coil wires within the surface.

A first flange of the flanges is configured to be disposed adjacent to a core surface with the core surface not adjacent to the coil wires. A second flange of the flanges is configured to be disposed at an edge of the surface away from the core. A third flange of the flanges is configured to be disposed at an edge of a separator in a passage of the coil winding portion with the separator disposed between two cores.

FIGS. 7A-7D illustrate flow charts for forming a coil former according to some embodiments. In FIG. 7A, operation 700 removes a portion of a flange with the flange configured for constraining a winding coil wire around a winding surface. The flange is disposed outside the winding surface. The portion of the flange is disposed between the coil wire and a core of one or more cores. The winding surface configured to form a passage. The passage is configured to accept portions of the one or more cores in a same direction or in opposite directions.

In FIG. 7B, operation 710 forms flanges of a coil former outside a winding surface of a winding coil wire. The flanges are configured for constraining the winding coil wire around the winding surface. The flanges are configured to not presence between the coil wire and a core of one or more cores.

In FIG. 7C, operation 720 forms a flange of a coil former outside a winding surface of a winding coil wire with the flange configured for constraining the winding coil wire. The flange is extended in a direction parallel to the winding surface and perpendicular to a direction of the winding coil wire. The flange is configured to be adjacent a core or between two cores of one or more cores.

In FIG. 7D, operation 730 maximizes a winding window for a coil former by forming a flange outside a winding surface of the coil former. The flange not formed between winding coil wire and a core surface. Or the flange is thinner in thickness at an area between winding coil wire and a core surface. Or the flange is thinner in thickness at a portion of an area between winding coil wire and a core surface.

FIG. 8 illustrates a flow chart for forming a coil former according to some embodiments. In FIG. 8A, operation 800 forms flanges of a coil former outside a winding surface of winding coil wires. The flanges are configured for constraining the winding coil wires around the winding surface. The winding surface configured to form a passage. The passage is configured to accept portions of one or more cores in a same direction or in opposite directions.

The flanges comprise a first portion extended outward from the winding surface and extended along a direction of the winding coil wires. The first portion is configured to not present between the coil wires and a first core of the one or more cores. The flanges comprise a second portion coupled to outer edges of the winding surface. The second portion is extended outward from the winding surface and extended perpendicular to the direction of the winding coil wires.

The second portion is configured to be adjacent to a second core of the one or more cores. The flanges comprise a third portion coupled to outer edges of the winding surface. The second portion is extended outward from the winding surface and extended perpendicular to the direction of the winding coil wires. The second portion is configured to be adjacent and between cores of the one or more cores. The second portion is coupled to a support disposed in the passage connecting different portions of the winding surface.

Coil Former Configurations

In some embodiments, the present invention discloses coil formers to form electromagnetic components with increase efficiency, for example, by increasing winding window.

Figures 9A, 9B, 9C:
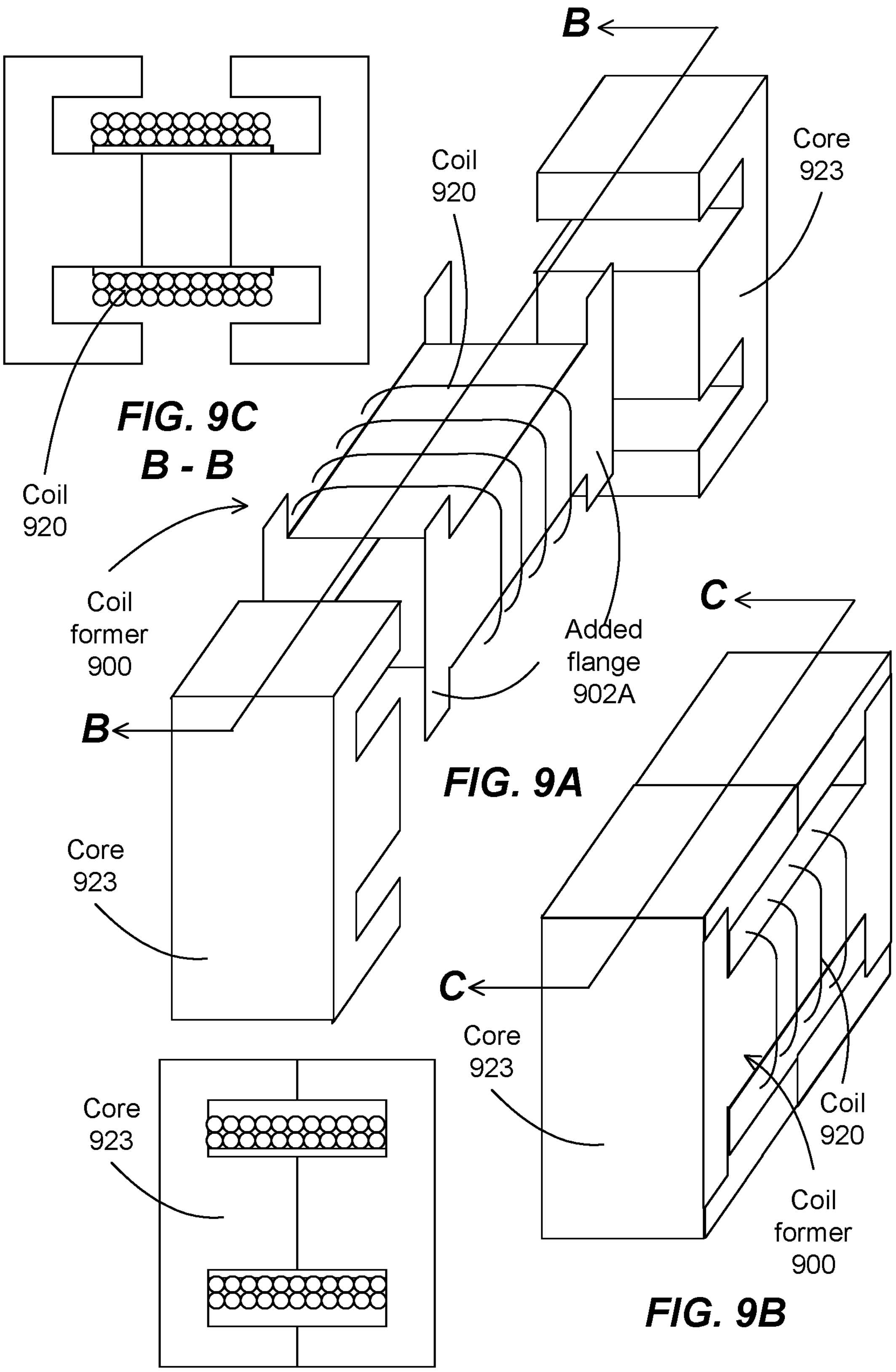

FIGS. 9A-9D illustrate an inductor assembly or a coil assembly having a coil former with added flanges according to some embodiments. The added flanges can be used for restraining the coil wires, which can be essential for automatic winding of coil wires. The added flanges can allow an increased in winding windows of the coil wires. FIG. 9A shows an exploded view of the inductor or coil assembly. FIG. 9B shows an assembled view of the inductor or coil assembly. FIG. 9C shows a cross sectional view of the exploded view. FIG. 9D shows a cross sectional view if the assembled view.

In FIG. 9A, an inductor or coil assembly includes a coil former 900 having a coil wire 920 wound on surfaces of the coil former, together with two cores 923. The cores are e-cores, e.g., having a shape of a capital letter E. The coil former has a tube forming a winding surface at sides of the tube. A coil wire 920 is wound around the tube on the winding surface.

The coil former has added flanges at both ends of the tube. The added flanges extend from the surfaces of the tube, such as extending from the right and left side surfaces of the tube. The extension occurs in a planar surface formed by a side surface of the tube. Alternatively, the extension can occur in a planar surface formed by a side surface of the core. The extension can occur in a direction parallel to the side surface, to extend the side surface outward in both end directions. The extension can occur in a direction perpendicular to an adjacent side surface, to extend the side surface upward and downward for constraining the coils.

The added flanges are extended from the side surfaces in planar directions, e.g., in right and left planes. Thus, the coils are exposed facing the cores, as shown in the cross sectional view FIG. 9C.

In FIG. 9B, the inductor or coil assembly is assembled, with the two cores brought together to enclose the coil former. Since the coils are exposed at the top and bottom winding surfaces, the cores contact or are in immediate adjacent or vicinity of the coils, as shown in the cross sectional view FIG. 9D.

The added flanges can be configured to protect the cores, for example, by extending far enough to cover the side surfaces of the cores. As shown, the added flanges completely cover the width of the cores, but not completely cover the height of the cores.

Figures 10A, 10B, 10C:
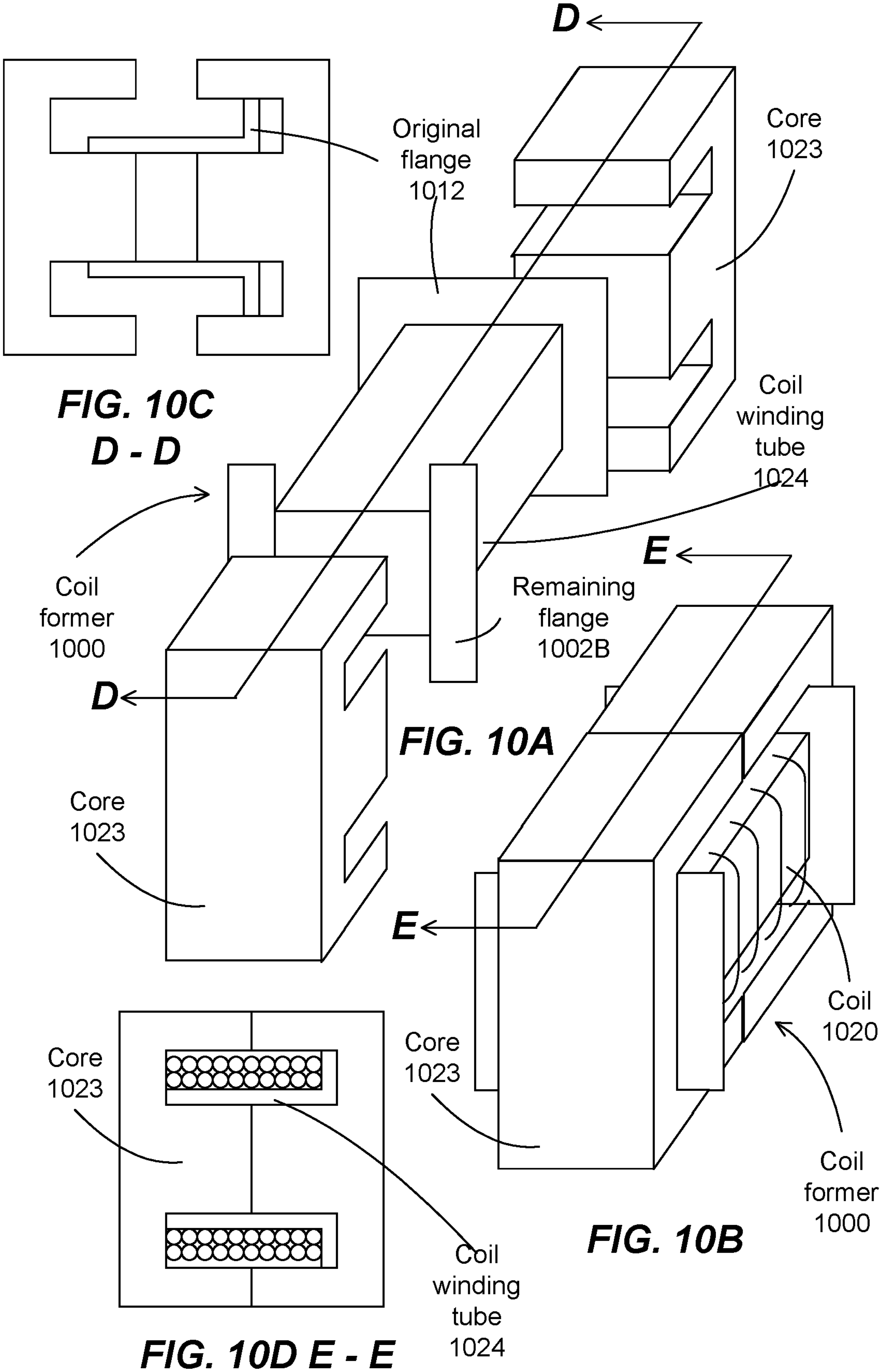

FIGS. 10A-10D illustrate an inductor or coil assembly having a hybrid coil former according to some embodiments. As shown, the coil former has optional (or remaining) flanges at one end and original flanges at the opposite end of the tube. FIG. 10A shows an exploded view of the inductor or coil assembly. FIG. 10B shows an assembled view of the inductor or coil assembly. FIG. 10C shows a cross sectional view of the exploded view. FIG. 10D shows a cross sectional view if the assembled view.

In FIG. 10A, an inductor or coil assembly includes a coil former 1000 having a coil wire (not shown) wound on surfaces of the coil former 1000, together with two cores 1023. The coil former has optional or remaining flanges 1002B at one end of the tube 1024, and original flanges 1012 at an opposite end of the tube. The original flanges can include flanges at all sides of a periphery of the winding surface, e.g., flanges at the right side, left side, top side, bottom side, and at four corners. Thus, the original flanges can completely constrain the coils within the winding surface.

The optional or remaining flanges can be the original flanges with selected portions removed. The removed portions are selected at areas the coils facing the cores, such as the flange portions at the top and bottom sides. With the removed flange portions, the winding window can increase. The coil constrain property is not noticeably affected, since the corner flanges can serve to constrain the coils in the removed flange portions.

The original flanges can provide coil constrain property, but with lower winding window, as shown in the cross sectional view FIG. 10C. The left tube end has the flange removed in the remaining flange configuration. The right tube end still has the flange in the original flange configuration.

In FIG. 10B, the inductor or coil assembly is assembled, with the two cores brought together to enclose the coil former. Since the coils are exposed at the top and bottom winding surfaces at one end of the tube, as shown in the cross sectional view FIG. 10D, the left core contacts or is in immediate adjacent or vicinity of the coils, while the right core interfaces the coils with an original flange, e.g., there is the original flange thickness between the core and the coils in the right end of the tube.

An advantage of the remaining flange configuration is an increase in the winding window, as shown in the cross sectional view FIG. 10D.

As shown, the winding window increase occurs at the left tube end with the remaining flange configuration at the left tube end. Alternatively, the winding window increase can occur at both left and right tube ends if the remaining flange configurations are performed at both tube ends.

Figure 11A:
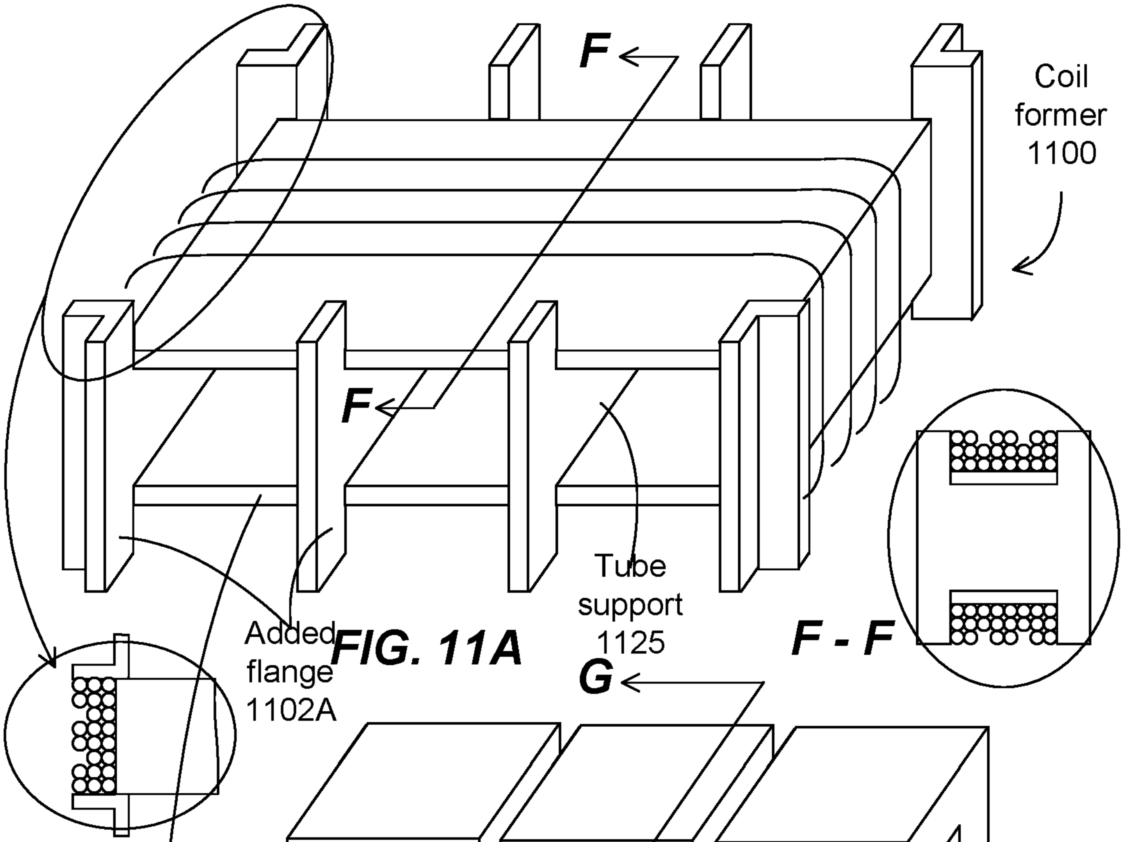
FIGS. 11A-11B illustrate an inductor or coil assembly having a coil former with modified flanges according to some embodiments.
Figure 11B:
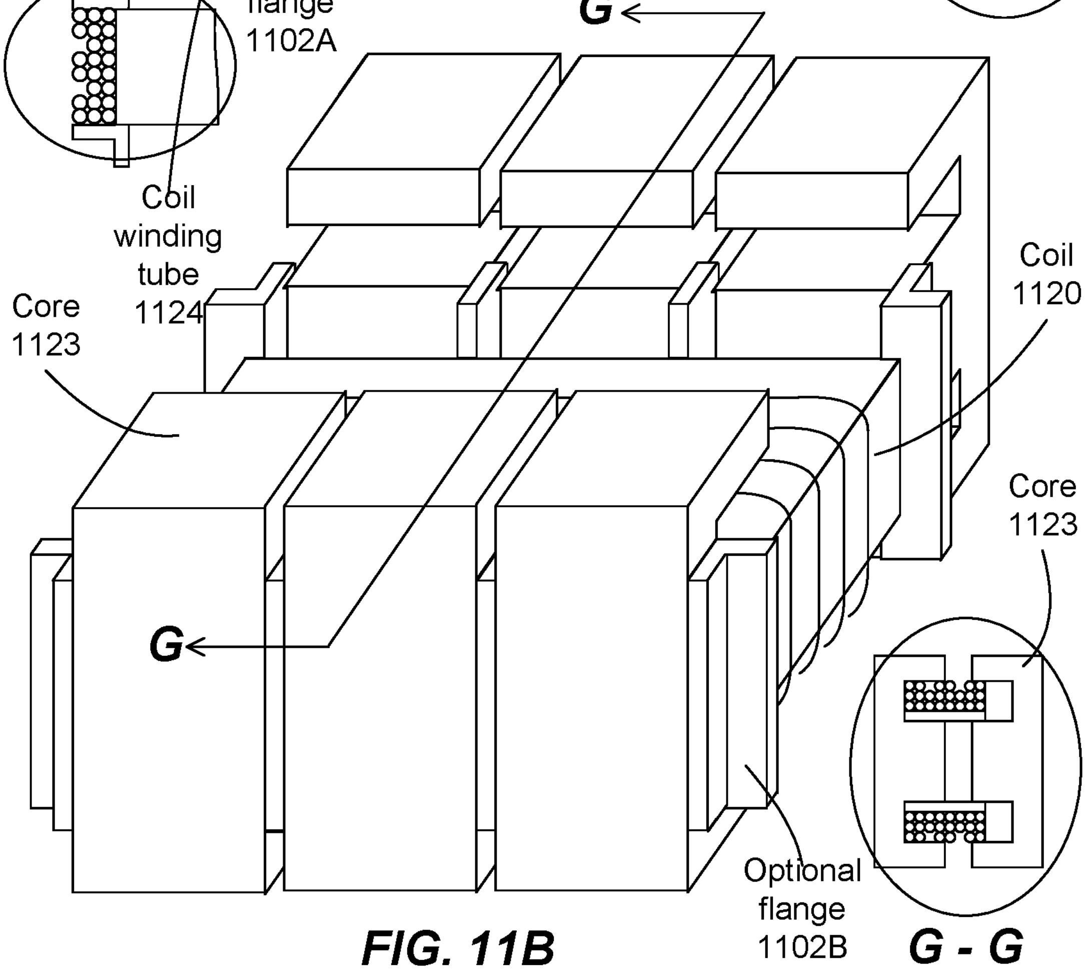

FIGS. 11A-11B illustrate an inductor or coil assembly having a coil former with modified flanges according to some embodiments. The coil former 1100 can include a coil winding tube 1124, which can have different cross sections such as a rectangular tube as shown, rounded rectangular tube, square tube, rounded square tube, or circular tube as in the case of PQ cores. The coil winding tube can have a coil winding surface, on which coil wires are wound to form coils 1120. The coil winding tube can have hollow passageway to accept one or more cores 1123, such as the middle legs of e-cores.

In some embodiments, the coil former can have outer flanges 1102B (or optional or remaining flanges, since the outer flanges can be optional or can be remaining flanges after flange portions are removed), disposed along short ends of the coil winding tube 1124. The outer flanges are disposed outside of the winding surface in order not to reduce the coil winding surface area.

The outer flanges can be configured to be running along the direction of the coil wires 1120 around the passageway at two opposite sides of the winding tube 1124, such as along two short sides of the rectangular winding tube. While running along the short sides of the winding tube, the outer flanges extend in a direction perpendicular to the coil winding surface to retrain the coil wires. The outer flanges extend a distance enough to cover the coils 1120, such as to ensure that the coils are protected.

The outer flanges 1102B can be configured to not running along the long sides (e.g., top and bottom sides as shown). Thus, after assembly, cores 1123 can be placed between the outer flanges 1102B. Without the outer flanges along the long sides, the cores can directly contact the coil winding surface and the coil wires, so that there can be no reduction of the winding window.

In some embodiments, the outer flanges 1102B are optional, or can be sectioned into multiple segments, such as top and bottom corner flanges, instead of long running side flanges. A purpose of the outer flanges is to restrain the coil wires, and thus segmented flange can be used.

In some embodiments, additional flanges 1102A can be added for constraining the coil wires within the coil winding surface, for example, to assist in an automatic coil winding process, especially in long rectangular winding tubes. The additional flanges 1102A are configured to be not disposed between the cores and the coil wires, such as away from the cores. For example, the additional flanges can be disposed at short sides of the core, such as perpendicular to the outer flanges 1102B. In addition, the additional flanges can be disposed in the winding tube, such as to provide supports 1125 to the winding tube. The inside flanges can be support flanges, since they can be extended from supports in the passage way of the winding tube.

In some embodiments, the additional flanges are configured so that the ends of the additional flanges can function to restrain the coil wires, e.g., the ends of the additional flanges are configured to be perpendicular to the direction of the coil wires and to be extended outward from the coil winding surface. For example, the additional flanges can include a plate parallel to the short sides if the winding tube, with end portions larger than the short side surface for restraining the coil wires.

At the short sides, the additional flanges can be configured to be running along the direction of the coil wires 1120, similar to the outer flanges. While running along the portion of the passageway, the additional flanges extend outside in a direction parallel to the coil winding surface. After passing the winding surface, the additional flanges can extend upward and downward to provide constraint to the coil wires.

Within the winding tube, the additional flanges can be configured to be running perpendicular to the direction of the coil wires 1120. After passing the winding surface, the additional flanges can extend upward and downward to provide constraint to the coil wires.

FIG. 11A shows a perspective view of a coil former with wound coils, together with inset views of selected portions of the coil former. For example, at the left portion, the coils are constrained by the remaining flanges, as a top view. At the cross section view F-F, the coils are constrained by the support flanges or the added flanges at middle of the coil former.

FIG. 11B shows a partial assembly view of the coil assembly, with one (left) core fully assembled, and one (right) core partially assembled. The assembled cores are separated by the middle additional or support flanges. End cores are sandwiched between middle and end flanges. At the cross section view G-G, the coils are immediately adjacent to the cores, leading to an increase in winding window.

Figure 12A:
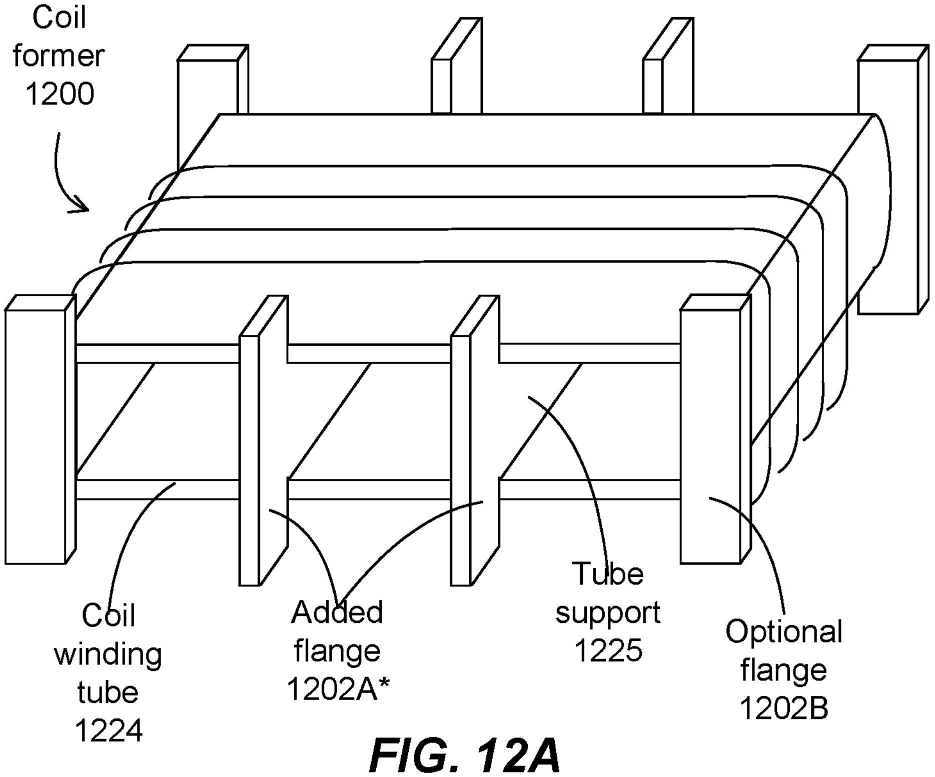
FIGS. 12A-12B illustrate coil formers with flange configurations according to some embodiments.
Figure 12B:
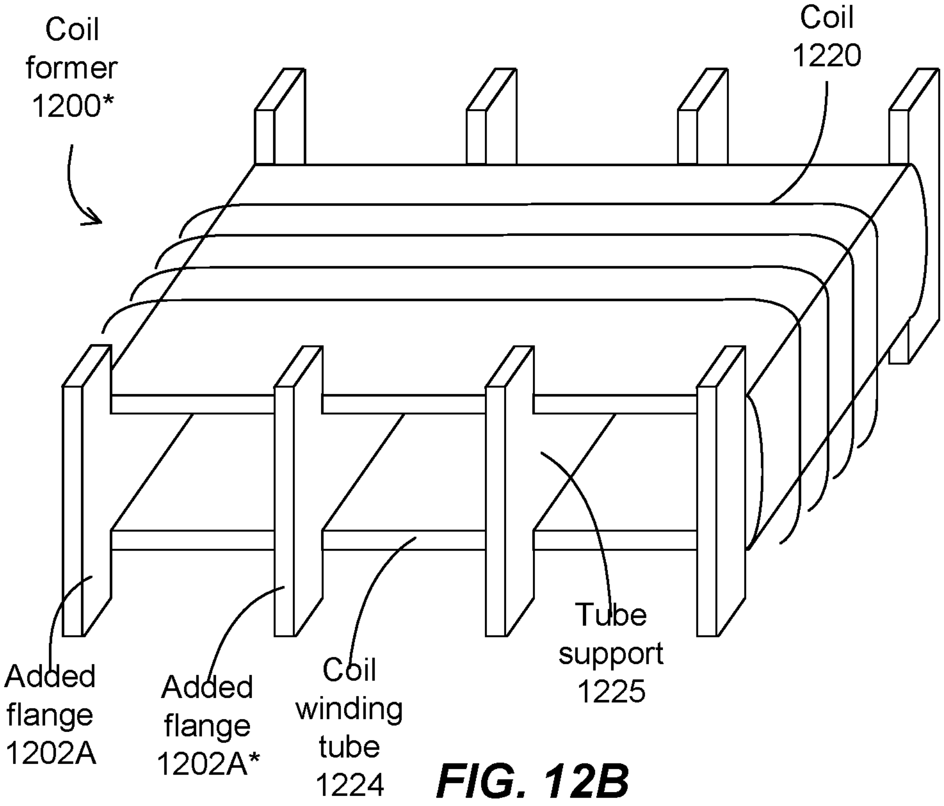

FIGS. 12A-12B illustrate coil formers with flange configurations according to some embodiments. In FIG. 12A, the coil former 1200 can include a coil winding tube 1224, which can be a rectangular tube as shown. The coil winding tube can have a coil winding surface, on which coil wires are wound to form coils. The coil winding tube can have hollow passageway to accept one or more cores.

The coil former can have outer flanges 1202B (or optional flanges, since the outer flanges can be optional), disposed along short ends of the coil winding tube 1224. The outer flanges are disposed outside of the winding surface in order not to reduce the coil winding surface area.

The coil former can have additional flanges 1202A* (or support flange) for constraining the coil wires within the coil winding surface, for example, to assist in an automatic coil winding process, especially in long rectangular winding tubes. The additional flanges 1202A* are configured to be not disposed between the cores and the coil wires, such as away from the cores. For example, the additional flanges can have a portion disposed in the winding tube, such as to provide supports 1225 to the winding tube.

In FIG. 12B, the coil former 1200* can include a coil winding tube 1224, which can have a rectangular tube as shown. The coil former can have additional flanges 1202A for constraining the coil wires within the coil winding surface. The additional flanges 1202A can be disposed at short sides of the core, such as perpendicular to the outer flanges 1202B. In addition, the additional flanges 1202A* can be disposed in the winding tube, such as to provide supports 1225 to the winding tube. The coil former can be configured to not having outer flanges.

Figure 13A:
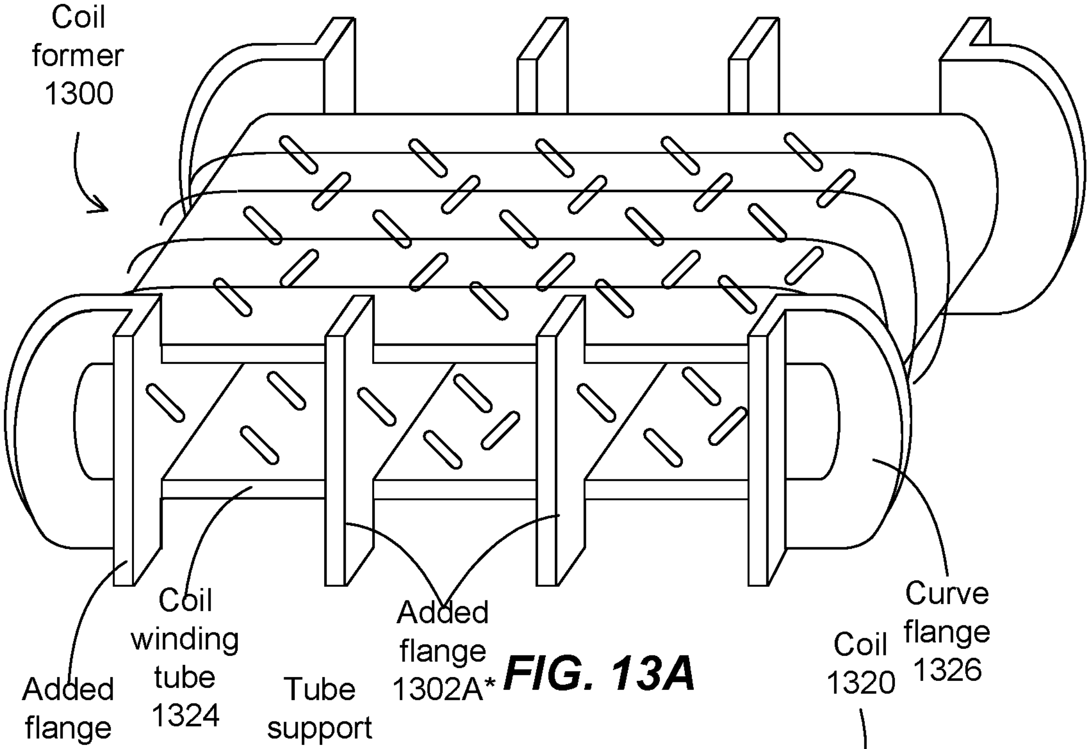
FIGS. 13A-13D illustrate a coil former configuration with curve flange according to some embodiments.

FIGS. 13A-13D illustrate a coil former configuration with curve flange according to some embodiments. FIG. 13A shows a winding tube of the coil former having a curve cross section, for example, for ease of winding coil wires. The curve flanges 1326 can be the remaining flanges with a curve shape along the coils for protecting the coils. Multiple holes 1327 can be formed on the coil former, such as on the curve flanges 1326, on the flanges 1302A or 1302A*, and on the coil winding tube 1324. The holes 1327 can reduce the stiffness of coil former to avoid core cracking due to thermal expansion of the individual materials. In addition, the holes can be beneficial during a potting process for the inductor or the transformer using the coil former. For example, the holes can improve the heat transfer between the coils 1320 and the core, since the potting material in the holes can have a higher thermal conductivity than the coil former material. Further, the potting material can be distributed more easily through the holes during the pouring process, and air bubbles can escape easier under vacuum with a vacuum potting process.

Figure 13B:
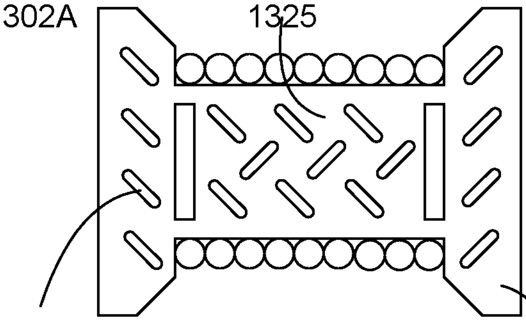
Figure 13C:
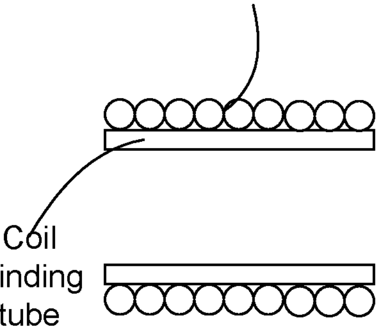
Figure 13D:
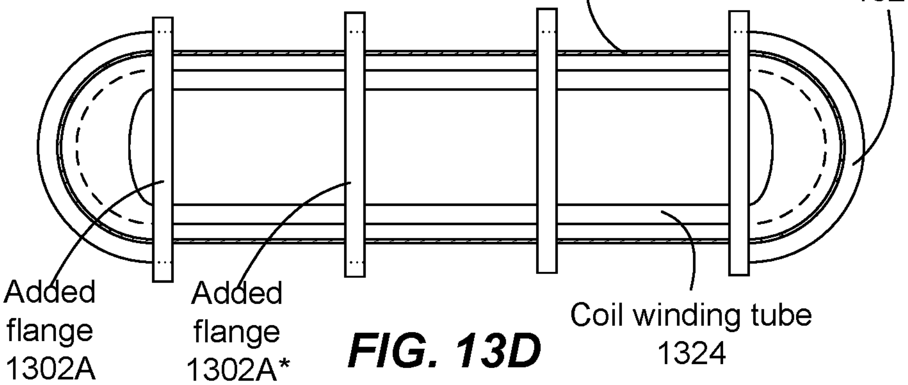

FIG. 13B shows a cross section view across an added flange 1302A or 1302A*, showing a distribution of holes 1327 in the flange portion and in the tube support portion 1325. Cross sections of the coils are also shown. FIG. 13C shows a cross section view between the added flange, e.g., showing no flange, showing the walls of the winding tube and the cross sections of the coils 1320. FIG. 13D shows a side view of the coil former, showing the curve flanges 1326 at ends of the coil former, together with the coils 1320 wound around a coil winding tube 1324, and constrained by flanges 1302A and 1302A*.

FIGS. 14A-14D illustrate a coil former configuration with coil separators according to some embodiments. The coil former can have separators for separating primary and secondary windings. The primary and secondary windings are configured to provide necessary creepage and clearance distances to make sure the primary winding coil and the secondary windings are not shorted.

The term "creepage" indicates the minimum distance along a surface of insulation between the primary winding coil and the secondary winding coil. The term "clearance" indicates the minimum distance between the primary winding coil and the secondary winding coil through air. For example, insulation tapes can be applied for isolation and insulation.

To increase insulation between windings, such as between the primary and secondary windings, winding separators 1428 can be added to the coil former to physically separate the windings. The separators can be lanes or ridges protruded from the winding surface along the direction of the winding coils, e.g., along a periphery of the tube. Thus, the separators can separate the coils in different windings.

Figure 14A:
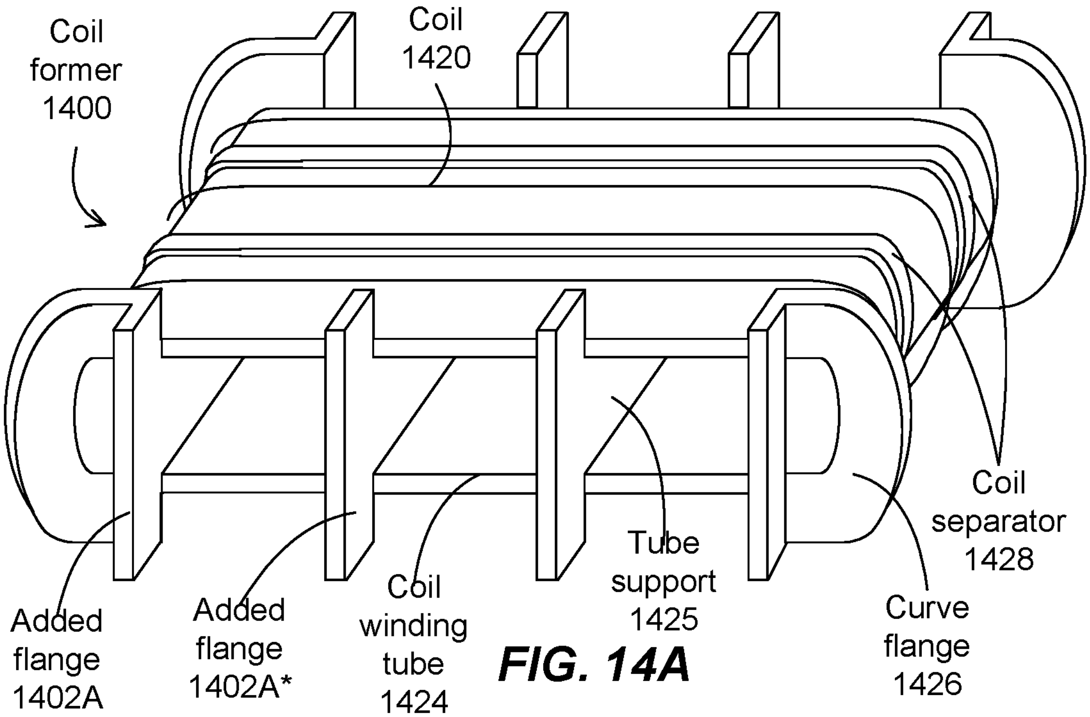
FIGS. 14A-14D illustrate a coil former configuration with coil separators according to some embodiments.

FIG. 14A shows a coil former 1400 having a coil winding tube 1424 for winding a core wire. The coil winding tube can have a long cross section, e.g., longer in width than in height. Tube supports 1425 can be added to support the winding surfaces, such as the top and bottom surfaces.

The coil former can have curve flanges 1426 at left and right sides of the tube, with the curve flanges being the remaining flanges having a curve shape along the coils. The coil former can have added flanges 1402A at ends of the tube and added flanges 1402A* at middle of the tube. The added flanges 1402A and 1402A* can be extended from the side winding surfaces or from the supports, respectively, for constraining the coils.

Two coil or winding separators 1428 can be disposed on the winding surface along the direction of the coils. With two separators, the coils can be separated into three windings, such as a primary winding and two secondary windings. Different numbers of separators can be used, such as one separator for two windings, or three separators for four windings.

The width of the separators, e.g., the separation distance between windings, can depend on the insulation requirements. A thicker separator can be used for high voltages to provide high insulation, for example. Further, the separator material can be the same as the coil former or can be different, to provide a same or different insulation properties.

The height of the separators can also depend on the insulation requirements and on the configuration of the coils. For example, if the windings are separately bundled, e.g., insulation tape are used to separately bundle the different windings, then a short separator height can be used, with air used as insulation material between the winding bundles. If air insulation is not adequate, for example, for very high voltages, higher separators can be used with better insulation material properties.

Figure 14B:
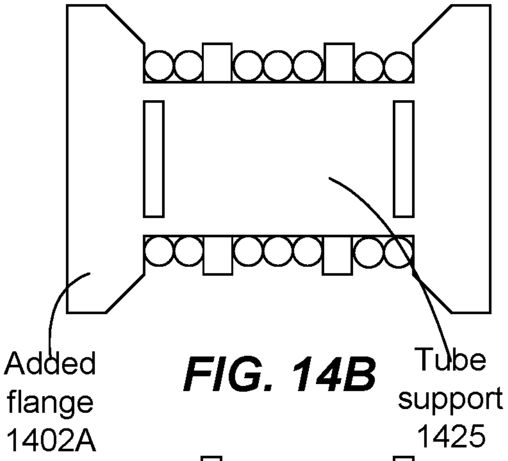
Figure 14C:
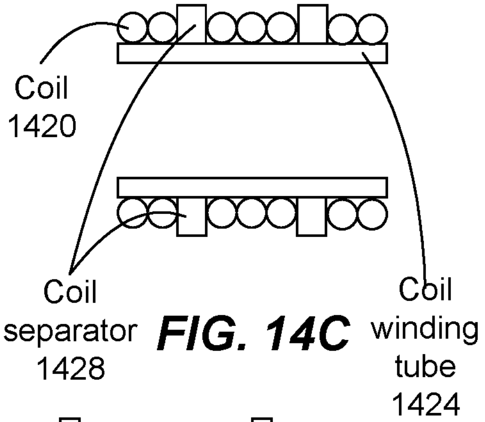
Figure 14D:
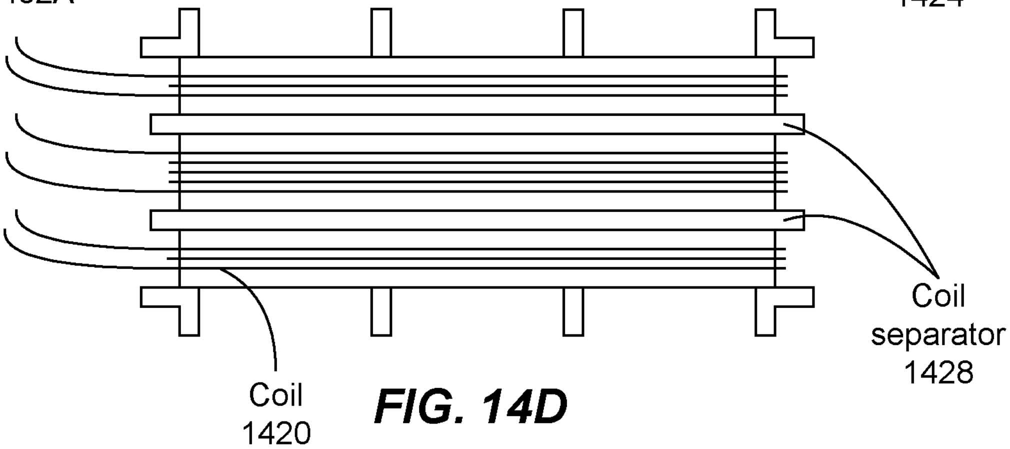

FIG. 14B shows a cross section view across an added flange 1402A or 1402A*, showing a distribution of separators 1428 with the tube support portion 1425. Cross sections of the coils are also shown, which are separated by the separators. FIG. 14C shows a cross section view between the added flanges, e.g., showing no flange, showing the walls of the winding tube, the cross sections of the coils 1420, and the separators 1428 between the coils. FIG. 14D shows a top view of the coil former, showing the separators 1428 configured to separate the coils 1420.

In some embodiments, the present invention discloses coil formers for PQ cores.

FIGS. 15A-15D illustrate a coil former configuration for a PQ core inductor according to some embodiments. FIG. 15A shows an exploded view of a PQ coil assembly, in which the coil former 1530 can be a PQ coil former, e.g., configured to accept PQ cores. A PQ coil former 1530 can be configured to accept a top PQ core and a bottom PQ core, with coils wound on the cylindrical tube of the PQ coil former.

The coil former 1530 can include a coil winding tube 1524, which can be a circular tube for accepting PQ cores. The coil winding tube can have a coil winding surface 1521, on which coil wires are wound to form coils 1520. The coil winding tube can have a hollow passageway 1522 to accept one or more cores PQ 1531, such as the middle rod of the PQ cores.

The coil former can have flanges 1502, disposed at ends and outside of the coil winding surface 1521, to restrain the coil wires 1520, and not to reduce the coil winding surface area. The flanges 1502 can be designed from a complete flange configuration, e.g., a flange configuration with a full circle flange. Then portions of the full circle flanges are removed, for example, at the no flange areas 1512A. The no flange areas are the areas facing inner surfaces of the PQ cores, and can be areas that are disposed between the core surfaces and coils when the cores are assembled to the coil former. Thus, by not allowing flanges at the no flange areas, e.g., by removing flange portions at the no flange areas, the core surface can contact or be in immediate adjacent or vicinity of the coils.

The flanges can be configured to mate with the PQ cores, e.g., disposed at cut areas in the PQ cores. The flanges 1502 can be configured with at least portions 1512A of the flanges removed, e.g., there is no flange corresponded to the connection portions of the PQ cores.

By removing the portions 1512A of the flanges so that the cores directly contact the coil winding surface and the coil wires, there can be no reduction of the winding window, e.g., no reduction of the coil winding surface. Thus, the outer flanges can be configured so that there is no flange portions disposed between the cores and the coil wires, or so that the cores directly contact the coil wires.

FIG. 15B shows a top view of the configuration shown in FIG. 15A. The coil former has the flanges 1502 next to the cores, e.g., the flanges 1502 are not in the way of the cores when the cores are assembled with the coil former. In other words, the full circle flange can have flange portions removed at the areas corresponded to the shape of the PQ cores.

FIG. 15C shows a cross sectional view H-H across the flanges 1502 of the coil former. The flanges are shown, which can constrain the coils, for example, during an automatic winding process. FIG. 15D shows a cross sectional view I-I across the no flange areas 1512A of the coil former. Without the flanges, the winding window can increase. The coil constrain property is performed by the flanges 1502, thus, the absence of removal of the flanges at the no flange areas can show no disadvantages.

Figure 16A:
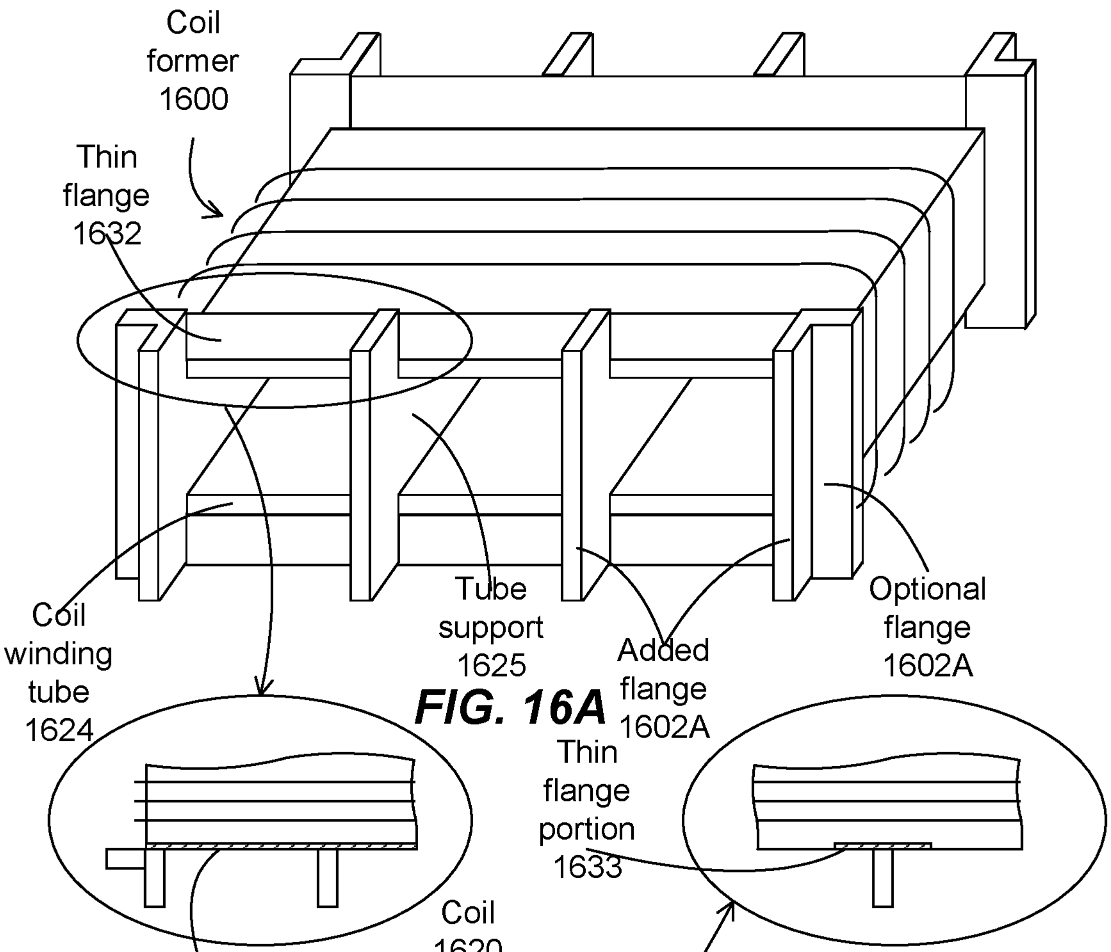
FIGS. 16A-16B illustrate coil former configurations with thin flanges according to some embodiments.
Figure 16B:
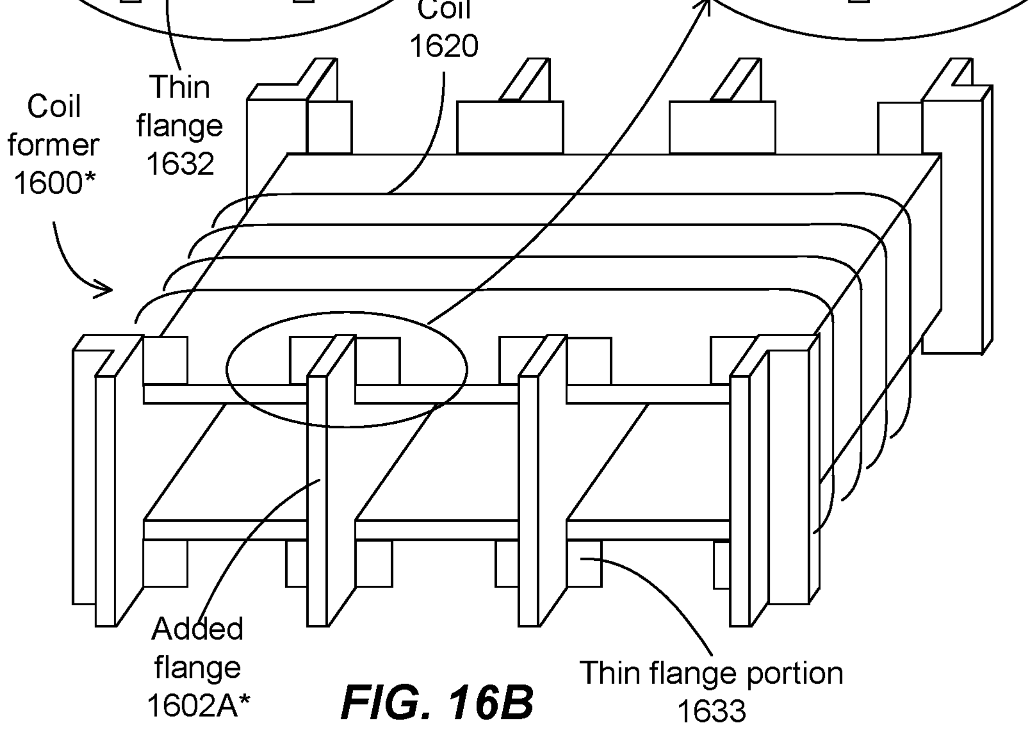

FIGS. 16A-16B illustrate coil former configurations with thin flanges according to some embodiments. The flanges can be thin or can have gaps.

In some embodiments, instead of completely removing flanges at the no flange areas, thin flanges, gap flanges, or thin gap flanges can be used. The thin flanges can have a thickness less than the thickness of the constrain flanges, thus can perform some constraining action while having some increase in the winding window. The gap flanges, or the fenced flanges, can have flanges at certain areas (e.g., at the fence posts) and no flanges in between (e.g., between the fence posts). The gap flanges can have better heat transfer property from the heated coils to the cores to the ambient, due to the gaps between the flange posts. The thin gap flanges can be thin at selected areas.

FIG. 16A shows a coil former 1600 having thin flanges 1632 at the no flange areas, e.g., at the flange removal areas as discussed above. The coil former 1600 can include a coil winding tube 1624, which can be a rectangular tube as shown. The coil winding tube can have a coil winding surface, on which coil wires are wound to form coils.

The coil former can have outer flanges 1602B disposed along short ends of the coil winding tube 1624. The outer flanges are disposed outside of the winding surface in order not to reduce the coil winding surface area.

The coil former can have additional flanges 1602A* for constraining the coil wires within the coil winding surface. The additional flanges 1602A* are configured to be not disposed between the cores and the coil wires, such as away from the cores. For example, the additional flanges can have a portion disposed in the winding tube, such as to provide supports 1625 to the winding tube.

The thin flanges can be coupled to the end optional flanges 1602A. The thin flange can have thickness less than the thickness of the other flanges, such as the remaining flanges or the added flanges, as shown in the inset figure associated with FIG. 16A.

FIG. 16B shows a coil former 1600* having thin gap flanges 1633 at the no flange areas coupled to the added flanges 1602A* as shown. The coil former 1600 can include a coil winding tube 1624, with a coil winding surface for winding a coil wire.

The thin flanges can be coupled to other flanges, with a gap between two adjacent thin flanges. The thin flange can have thickness less than the thickness of the other flanges, such as the remaining flanges or the added flanges, as shown in the inset figure associated with FIG. 16B

What is claimed is:

1. A coil former, comprising:

a tube comprising a winding surface, wherein the winding surface comprises a boundary edge with the boundary edge disposed on a flat surface and formed an end of the tube, and wherein the winding surface is configured for winding a coil wire with the coil wire contacting or disposing at a vicinity of the flat surface; and a first flange coupled to a first portion of the boundary edge, wherein the first flange is extended from the first portion of the boundary edge for constraining the coil wire within the winding surface, and wherein the first flange is configured to expose a portion of the coil wire and a second portion of the boundary edge, with the portion of the coil wire disposed on a first portion of the winding surface comprising the second portion of the boundary edge; and a support disposed inside the tube for supporting two separate portions of the winding surface, wherein the support comprises a second flange extending outside the end of the tube, the second flange comprising a portion extended in directions comprising a component perpendicular to the two separate portions of the winding surface.

2. The coil former of claim 1, wherein the winding surface comprises a curve surface or a segmented surface comprising multiple flat or curve surfaces.

3. The coil former of claim 1, wherein the first flange comprises multiple components coupled to both ends of the tube.

4. The coil former of claim 1, wherein the first flange comprises a first portion extending from the first portion of the boundary edge in a direction comprising a component perpendicular to a second portion of the winding surface comprising the first portion of the boundary edge, and wherein the first flange comprises a second portion extending from the first portion in a direction comprising a component parallel to the second portion of the winding surface.

5. The coil former of claim 1, further comprising:

a third flange also coupled to the first portion of the boundary edge, wherein the third flange is extended from the first portion of the boundary edge in a direction comprising a component parallel to the second portion of the winding surface, and wherein the third flange is also extended beyond the first portion of the boundary edge for constraining the coil wire within the winding surface.

6. The coil former of claim 1, further comprising:

a separator disposed on the winding surface along a periphery of the tube, with the separator configured to separate the coil wire from another coil wire.

7. The coil former of claim 1, wherein the winding surface comprises a gap, and wherein the coil wire is wound across the gap on the winding surface.

8. A coil assembly, comprising:

a coil former;

a coil wire wound on the coil former and configured to generate a flow of magnetic flux; and one or more cores coupled to the coil former and configured to improve the magnetic flux flow, wherein the coil former comprises:

a tube comprising a winding surface, wherein the winding surface is configured for the coil wire to contact or dispose at a vicinity of a boundary edge of the winding surface; and a first flange coupled to the boundary edge, wherein the first flange is extended from the boundary edge for constraining the coil wire within the winding surface, and wherein the first flange is configured to enable the one or more cores to be immediately adjacent to the coil wire; and a support disposed inside the tube for supporting two separate portions of the winding surface, wherein the support comprises a second flange extending outside an end of the tube, the second flange comprising a portion extended in directions comprising a component perpendicular to the two separate portions of the winding surface.

9. The coil assembly of claim 8, wherein the winding surface comprises a curve surface or a segmented surface comprising multiple flat or curve surfaces.

10. The coil assembly of claim 8, wherein the one or more cores comprise a PQ core, and wherein the coil former is configured for the PQ core.

11. The coil assembly of claim 8, wherein the first flange comprises a first portion extending from the boundary edge in a direction comprising a component perpendicular to the winding surface comprising the boundary edge, and wherein the first flange comprises a second portion extending from the boundary edge in a direction comprising a component parallel to the winding surface comprising the boundary edge.

12. The coil assembly of claim 8, wherein the first flange is configured to be absent between the coil wire and a core of the one or more cores to allow the core to contact or to dispose at a vicinity of the coil wire.

13. The coil assembly of claim 8, further comprising:

a third flange also coupled to the boundary edge, wherein the third flange is extended from the winding surface comprising the boundary edge in a direction comprising a component parallel to the winding surface, and wherein the third flange is also extended beyond the first portion of the boundary edge for constraining the coil wire within the winding surface.

14. The coil assembly of claim 8, further comprising:

a third flange extended from the winding surface to contact a surface of a core of the one or more cores.

15. The coil assembly of claim 8, further comprising:

a third flange also coupled to the boundary edge, wherein the third flange is disposed adjacent to a surface of a core of the one or more cores with the surface not adjacent to the coil wire.

16. The coil assembly of claim 8, further comprising:

the support disposed inside the tube and disposed between two cores of the one or more cores, wherein the second flange extends outside the end of the tube, the second flange comprising a portion extended away from the winding surface for constraining the coil wire.

17. The coil assembly of claim 8, further comprising:

a separator disposed on the winding surface along a periphery of the tube, with the separator configured to separate the coil wire from another coil wire.

* * * * *